United States Patent
Morikawa

(10) Patent No.: US 9,240,062 B2
(45) Date of Patent: Jan. 19, 2016

(54) NODE ARRANGING APPARATUS, NODE ARRANGING METHOD, AND STORAGE MEDIUM

(71) Applicant: SOFTWARE CRADLE CO., LTD., Osaka-shi, Osaka (JP)

(72) Inventor: Hiroshi Morikawa, Osaka (JP)

(73) Assignee: SOFTWARE CRADLE CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 14/511,270

(22) Filed: Oct. 10, 2014

(65) Prior Publication Data

US 2015/0154787 A1    Jun. 4, 2015

(30) Foreign Application Priority Data

Oct. 24, 2013   (JP) ................. 2013-220724

(51) Int. Cl.
| | |
|---|---|
| G06T 11/20 | (2006.01) |
| G06T 15/00 | (2011.01) |
| G06T 19/20 | (2011.01) |

(52) U.S. Cl.
CPC ........... G06T 11/206 (2013.01); G06T 15/005 (2013.01); G06T 19/20 (2013.01); G06T 15/00 (2013.01)

(58) Field of Classification Search
None
See application file for complete search history.

(56) References Cited

U.S. PATENT DOCUMENTS

2004/0205058 A1   10/2004 Kiji
2010/0153082 A1*   6/2010 Newman et al. .......... 703/11

FOREIGN PATENT DOCUMENTS

| JP | 2004-246879 | 9/2004 |
| JP | 2006-018517 | 1/2006 |
| JP | 2006-350504 | 12/2006 |

OTHER PUBLICATIONS

Plaisant et al "Spacetree: Supporting exploration in large node link tree, design evolution and empirical evaluation." Information Visualization, 2002. INFOVIS 2002. IEEE Symposium on. IEEE, 2002.*
Turner et al (The Elastic Surface Layer Model for Animated Character Construction, Communicating with virtual worlds. Springer Japan, 1993. 399-412.).*
Min et al ("3D interactive clothing animation", Computer Application and System Modeling (ICCASM), 2010 International Conference on. vol. 11. IEEE, 2010).*

* cited by examiner

Primary Examiner — Carlos Perromat
Assistant Examiner — Xin Sheng
(74) Attorney, Agent, or Firm — Troutman Sanders LLP

(57) ABSTRACT

A node arranging apparatus includes: a node arranging unit that arranges, in a virtual three-dimensional space, nodes indicated by inter-node information stored in an inter-node information storage unit; a node moving unit that moves each node using a movement amount and a movement direction of that node determined by arrangement relationship of that node with a first plane, arrangement relationship with another node arranged in the virtual three-dimensional space, and arrangement relationship with at least one other node associated therewith by the inter-node information and arranged in the virtual three-dimensional space; a display information generating unit that generates display information of a node connection image where nodes are projected and connected; and an output unit that outputs the display information. The node moving unit repeatedly performs at least once the node moving process until a predesignated condition is satisfied.

7 Claims, 18 Drawing Sheets

| Node ID | Component name | Contact node ID | Amount of heat transmitted |
|---|---|---|---|
| 011 | j | 012 | 0.163086 |
| 011 | j | 013 | 0.163572 |
| 011 | j | 014 | 0.043406 |
| 011 | j | 015 | 0.130333 |
| 011 | j | 016 | 0.119326 |
| 011 | j | 017 | 0.130056 |
| 011 | j | 018 | 0.042783 |
| 011 | j | 019 | 0.086907 |
| 011 | j | 020 | 0.119962 |
| 012 | h | 011 | −0.163086 |
| 012 | h | 014 | 0.218499 |
| 012 | h | 016 | −0.016361 |
| 012 | h | 017 | −0.039029 |
| 013 | i | 011 | −0.163572 |
| 013 | i | 015 | 0.210509 |
| 013 | i | 019 | −0.004870 |
| 013 | i | 020 | −0.041975 |
| 014 | b | 011 | −0.043406 |
| ⋮ | ⋮ | ⋮ | ⋮ |
| 015 | a | 011 | −0.130333 |
| 015 | a | 013 | −0.210509 |
| 015 | a | 014 | −0.343832 |
| 015 | a | 017 | −0.081158 |
| 015 | a | 018 | −0.172719 |
| 015 | a | 019 | −0.061276 |
| 016 | f | 011 | −0.119326 |
| ⋮ | ⋮ | ⋮ | ⋮ |
| 017 | g | 011 | −0.130056 |
| ⋮ | ⋮ | ⋮ | ⋮ |
| 018 | c | 011 | −0.042783 |
| ⋮ | ⋮ | ⋮ | ⋮ |
| 019 | d | 011 | −0.086907 |
| ⋮ | ⋮ | ⋮ | ⋮ |
| 020 | e | 011 | −0.119962 |
| ⋮ | ⋮ | ⋮ | ⋮ |

FIG.6

| Node ID | Coordinates |
|---|---|
| 012 | $(x_{112}, y_{112}, z_{112})$ |
| 013 | $(x_{113}, y_{113}, z_{113})$ |
| 014 | $(x_{114}, y_{114}, z_{114})$ |
| 015 | $(x_{115}, y_{115}, z_{115})$ |
| 016 | $(x_{116}, y_{116}, z_{116})$ |
| 017 | $(x_{117}, y_{117}, z_{117})$ |
| 018 | $(x_{118}, y_{118}, z_{118})$ |
| 019 | $(x_{119}, y_{119}, z_{119})$ |
| 020 | $(x_{120}, y_{120}, z_{120})$ |

FIG. 7

| Node ID | Coordinates |
|---|---|
| 012 | $(x_{212}, y_{212}, z_{212})$ |
| 013 | $(x_{213}, y_{213}, z_{213})$ |
| 014 | $(x_{214}, y_{214}, z_{214})$ |
| 015 | $(x_{215}, y_{215}, z_{215})$ |
| 016 | $(x_{216}, y_{216}, z_{216})$ |
| 017 | $(x_{217}, y_{217}, z_{217})$ |
| 018 | $(x_{218}, y_{218}, z_{218})$ |
| 019 | $(x_{219}, y_{219}, z_{219})$ |
| 020 | $(x_{220}, y_{220}, z_{220})$ |

NODE ARRANGING APPARATUS, NODE ARRANGING METHOD, AND STORAGE MEDIUM

CROSS REFERENCE TO RELATED APPLICATION

This application claims priority under 35 U.S.C. §119 to Japanese Patent Application No. 2013-220724, filed on Oct. 24, 2013, the entire content of which being hereby incorporated herein by reference.

FIELD OF THE INVENTION

The present invention relates to apparatuses and the like for generating information for displaying an image in which multiple nodes are connected.

BACKGROUND

As a conventional technique, there is a known flow data generating method performed using: a first storage part in which a group of two-item relationship data is stored where each record thereof has first item data, second item data, and data indicating type of two-item relationship between the first item data and the second item data; and a second storage part in which a position in the first storage part of each value stored as the first item data or the second item data is stored as positional data; the method including the steps of: extracting, from the group of the two-item relationship data in the first storage part, first two-item relationship data in which first item data is taken as data that is a starting point of flow data; associating the starting point as a parent node and the second item data of the first two-item relationship data as a child node; adding the two-item relationship type of the first two-item relationship data to an arc between the nodes; searching for third two-item relationship data having second item data of second two-item relationship data as first item data, from the group of the two-item relationship data in the first storage part, referring to the positional data in the second storage part; associating the first item of the thus extracted third two-item relationship data as a parent node and the second item data of the third two-item relationship data as a child node; and adding the two-item relationship type of the extracted two-item relationship data to an arc between the nodes; wherein this process is repeated to generate a subtree in which the second item data of the first two-item relationship data is taken as a root. See, for example, JP 2004-246879A at page 1 and FIG. 1.

However, such a conventional technique is problematic in that multiple nodes cannot be properly and easily arranged.

For example, according to such a conventional technique, if the number of nodes increases or the connection relationship between the nodes becomes complicated, the connected nodes are arranged to be distributed in a wide range, or the lines connecting the nodes and the like cross each other, resulting in a problem that the connection relationship between the nodes is not easily viewable. Furthermore, if a parent node cannot be specified, there is a problem that the node may not be properly arranged.

SUMMARY

The present invention was arrived at in order to solve the above-described problems, and it is an aspect thereof to provide a node arranging apparatus and the like capable of properly and easily arranging multiple nodes.

The present invention is directed to a node arranging apparatus, including: an inter-node information storage unit in which inter-node information, which is information indicating a connection relationship between multiple nodes and is information having node identifiers of the multiple nodes, is stored; a node arranging unit that arranges, in a virtual three-dimensional space, nodes indicated by the inter-node information; a node moving unit that moves each node using a movement amount and a movement direction of that node determined by an arrangement relationship between that node arranged in the virtual three-dimensional space and a predesignated first plane, an arrangement relationship between that node arranged in the virtual three-dimensional space and another node arranged in the virtual three-dimensional space, and an arrangement relationship between that node arranged in the virtual three-dimensional space and at least one other node associated therewith by the inter-node information and arranged in the virtual three-dimensional space; a display information generating unit that generates display information for displaying a node connection image, which is an image in which nodes arranged in the virtual three-dimensional space are projected on a plane and is an image in which nodes associated with each other by the inter-node information are connected to each other; and an output unit that outputs the display information generated by the display information generating unit. The node moving unit repeatedly performs at least once the process that moves each node until a predesignated condition is satisfied, and the display information generating unit generates the display information for nodes that have been repeatedly moved by the node moving unit.

With this configuration, each node is repeatedly moved according to arrangement relationships with respect to a first plane, another node, and another node connected to that node. Thus, multiple nodes can be properly and easily arranged.

Furthermore, the node arranging apparatus of the present invention is such that the node moving unit includes: a first acquiring part that acquires, for each node arranged in the virtual three-dimensional space, a first parameter, which is a parameter having a magnitude that increases according to an increase in a distance to the first plane, and a direction approaching the first plane, and is a parameter used to acquire a movement amount and a movement direction of that node; a second acquiring part that acquires, for each node arranged in the virtual three-dimensional space, a second parameter, which is a parameter having a magnitude and a direction determined according to a distance and a direction with respect to another node arranged in the virtual three-dimensional space, and is a parameter used to acquire a movement amount and a movement direction of that node; a third acquiring part that acquires, for each node arranged in the virtual three-dimensional space, a third parameter, which is a parameter having a magnitude and a direction determined according to a distance and a direction with respect to at least one other node associated with that node by the inter-node information, and is a parameter used to acquire a movement amount and a movement direction of that node; a movement information acquiring part that acquires movement information, which is information indicating a movement amount and a movement direction of each node according to the first parameter, the second parameter, and the third parameter acquired for that node by the first acquiring part, the second acquiring part, and the third acquiring part; and a moving part that moves each node using the movement information.

With this configuration, nodes are moved toward the predesignated first plane so as to be arranged near the first plane, nodes that are arranged close to each other are moved so as to increase the distance therebetween, and nodes that are connected each other are moved so as to decrease the distance therebetween until the distance comes close to the first distance. Thus, multiple nodes can be properly and easily arranged.

Furthermore, the node arranging apparatus of the present invention is such that the first acquiring part acquires the first parameter having a direction perpendicular to the first plane and approaching the first plane.

With this configuration, the arrangement of nodes is changed while the nodes are moved closer to the first plane. Thus, multiple nodes can be arranged such that the nodes are close to the plane and have a proper inter-node distance therebetween.

Furthermore, the node arranging apparatus of the present invention is such that the second acquiring part acquires the second parameter for each node arranged in the virtual three-dimensional space, by acquiring, for that node, a parameter having a magnitude that increases according to a decrease in an inter-node distance with respect to each other node arranged in the virtual three-dimensional space, and a direction opposite from the other node, and compositing parameters acquired for respective other nodes.

With this configuration, each node can be moved so as not to be too close to other nodes.

Furthermore, the node arranging apparatus of the present invention is such that the third acquiring part acquires the third parameter for each node arranged in the virtual three-dimensional space, by acquiring, for that node, a parameter having a magnitude that increases according to an increase in a magnitude of a difference between an inter-node distance and a predesignated first distance with respect to each other node associated with that node by the inter-node information, and a direction according to a comparison result between the inter-node distance and the first distance, and compositing parameters acquired for respective other nodes, and the direction according to the comparison result is a direction toward the other node in a case where the comparison result indicates that the inter-node distance is larger than the first distance, and is a direction opposite from the other node in a case where the comparison result indicates that the inter-node distance is smaller than the first distance.

With this configuration, nodes that correspond to each other, such as nodes that are connected to each other can be moved so as to decrease the distance therebetween until the distance reaches the first distance.

Furthermore, the node arranging apparatus of the present invention is such that the node arranging unit arranges, in the virtual three-dimensional space, only nodes indicated by the inter-node information and satisfying a specific condition.

With this configuration, a node connection image having only nodes satisfying a specific condition can be displayed. For example, a node connection image having only nodes excluding a node to which the largest number of other nodes are connected can be displayed. Thus, the connection relationship between the nodes can be easily seen.

Furthermore, the node arranging apparatus of the present invention is such that the node moving unit repeatedly performs at least twice the process that moves each node, and the first acquiring part increases the magnitude of the first parameter each time the node moving unit performs the process that moves a node.

With this configuration, nodes can be prevented from being moved closer to the first plane rapidly from the very first, and, thus, the nodes can be properly arranged such that, for example, portions between the nodes are prevented from crossing each other.

The node arranging apparatus and the like according to the present invention can properly and easily arrange multiple nodes.

BRIEF DESCRIPTION OF THE DRAWINGS

FIG. 6 is a diagram showing an inter-node information management table of the node arranging apparatus in the Example.

FIG. 7 is a diagram showing a node arrangement management table of the node arranging apparatus in the Example.

FIG. 9 is a diagram showing a node arrangement management table of the node arranging apparatus in the Example.

DETAILED DESCRIPTION

Figure 1:
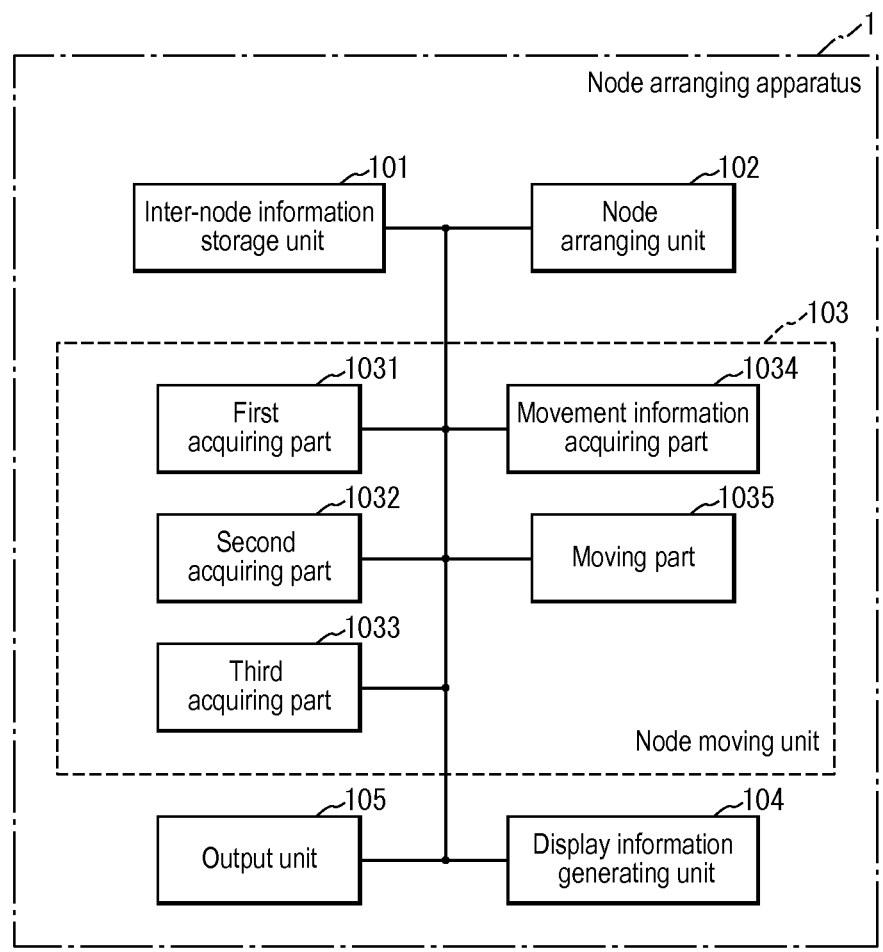
FIG. 1 is a block diagram of a node arranging apparatus in Example of the present invention.

Hereinafter, examples of a node arranging apparatus and the like will be described with reference to the drawings. Note that constituent elements denoted by the same reference numerals perform the same operations in the examples, and, thus, a description thereof may not be repeated.

EXAMPLE

FIG. 1 is a block diagram of a node arranging apparatus 1 in this Example.

The node arranging apparatus 1 includes an inter-node information storage unit 101, a node arranging unit 102, a node moving unit 103, a display information generating unit 104, and an output unit 105.

The node moving unit 103 includes a first acquiring part 1031, a second acquiring part 1032, a third acquiring part 1033, a movement information acquiring part 1034, and a moving part 1035.

In the inter-node information storage unit 101, inter-node information is stored. The inter-node information is information indicating a connection relationship between multiple nodes, and is information having multiple node identifiers of the multiple nodes. It is preferable that "multiple" is, for example, three or more.

A node refers to a connection point or a redistribution point for representing, for example, a connection relationship between components, devices, articles, people, events, information, or the like. The node may be considered as a graphic, an object, or the like representing the node.

Nodes contained in the inter-node information are associated with, for example, a component, a device, or the like. The component or the device is a concept that encompasses, for example, fluid such as air. Furthermore, the component or the device is a concept that encompasses a virtual component and a virtual device used in a simulation or the like. Furthermore, one node may be associated with, for example, a group of components, devices, or the like. The components or devices may be considered as virtual components or virtual devices, such as components or devices in a three-dimensional model that is arranged in a virtual three-dimensional space created using CAD or the like. The virtual components or virtual devices may be, for example, a three-dimensional model used when performing a simulation or the like regarding physical quantity in computer aided engineering (CAE), design data for components, or the like. Furthermore, if the volume and the like of components do not have to be taken into consideration, the components may be, for example, data of two-dimensional components that are arranged in a virtual two-dimensional space. Furthermore, the components may be gas such as air, or fluid such as liquid. The nodes contained in the inter-node information may be associated with articles, people, events, information, or the like.

A node identifier is information with which a node can be identified. For example, the node identifier is code or a name allocated to a node. The node identifier may be, for example, a name or an identifier of a component, a device, an article, a person, information, an event, or the like associated with a node. Furthermore, the node identifier may be associated with a name or an identifier of a component, a device, an article, a person, information, an event, or the like associated with a node. For example, the inter-node information may have, in association with each other, node identifiers and identifiers of components, devices, or the like associated with the nodes.

The connection relationship between nodes refers to, for example, whether or not the nodes are connected. The connection between nodes may be considered as a link between the nodes.

The inter-node information is, for example, information having one or at least two pairs of a node identifier of one node and node identifiers of one or at least two nodes connected to that node. The inter-node information may be a group of information having node identifiers of two nodes connected to each other.

Nodes being connected to each other may be considered as indicating, for example, that components, devices, or the like indicated by the node identifiers associated with the nodes are connected to each other, or that components, devices, articles, people, information, events, or the like indicated by the nodes are related to each other. The connection indicates, for example, that physical quantity can be transmitted, and is a concept that encompasses electrical connection, contact that allows physical quantity such as heat to be transmitted, and the like. The physical quantity is, for example, heat, electricity, vibrations, sounds, or the like.

The inter-node information may have information indicating the connection strength between nodes. The connection strength may be considered as the link strength between nodes. The connection strength is represented, for example, as a numerical value, an indicator, or the like. The connection strength may be considered as the magnitude of the physical quantity or the information amount transmitted between components, devices, or the like associated with the connected nodes. The information indicating the connection strength is, for example, stored in the inter-node information in associated with the pair of identifiers of two connected nodes.

Furthermore, the inter-node information may be information indicating the connection relationship between the nodes as described above, further indicating a connection direction between the connected nodes. The connection direction between nodes may be considered as the direction of a link between the nodes. The connection direction between nodes may be considered, for example, as a transmission direction or a movement direction of physical quantity or information between components, devices, articles, people, information, or events associated with the nodes. The information indicating the connection direction between nodes may be considered as information indicating a parent-child relationship, a dependence relationship, or the like between the nodes.

The inter-node information further indicating a connection direction between nodes is, for example, information having one or at least two pairs of a node identifier of one node that is a connection source and node identifiers of one or at least two nodes that are connection destinations of that node. Furthermore, the inter-node information further indicating a connection direction between nodes may be, for example, information having one or at least two pairs of a node identifier of one node that is a connection destination and node identifiers of one or at least two nodes that are connection sources of that node. The node identifier of a node that is a connection source is, for example, a node identifier associated with information (e.g., attribute value, etc.) indicating that this node is a connection source. Furthermore, the node identifier of a node that is a connection destination is, for example, a node identifier associated with information (e.g., attribute value, etc.) indicating that this node is a connection destination. For example, the connection source may be considered as a parent node or a superordinate node, and the connection destination may be considered as a child node or a subordinate node. Furthermore, the sign of a value of information indicating the connection strength (in other words, the link strength) between two nodes as described above contained in the inter-node information may be considered as information indicating the direction of the link. The inter-node information indicating the connection direction between nodes may be data for forming a directed graph.

The storing in this example is a concept that encompasses temporarily storing. The inter-node information storage unit 101 is preferably a non-volatile storage medium, but may be realized also by a volatile storage medium. Note that the same is applied to the description below.

The node arranging unit 102 arranges, in a virtual three-dimensional space, nodes indicated by the inter-node information stored in the inter-node information storage unit 101. The node arranging unit 102 arranges preferably multiple nodes, more preferably three or more nodes. The nodes indicated by the inter-node information are nodes indicated by the node identifiers contained in the inter-node information. The virtual three-dimensional space in which the nodes are to be arranged is, for example, a space represented by three orthogonal axes such as an x axis, a y axis, and a z axis. The arranging nodes is a concept that encompasses acquiring, for each node that is to be arranged, information indicating the position at which the node is to be arranged, for example, coordinates or a positional vector in a virtual three-dimensional space. For example, the node arranging unit 102 acquires information in which coordinates of each node that is to be arranged and a node identifier of the node are associated with each other. The position at which the node is to be arranged may be considered as the position at which an object such as a graphic, a symbol, a three-dimensional model, or a character string such as a node identifier associated with the node is to be arranged.

There is no limitation on how the node arranging unit 102 arranges nodes. For example, the nodes may be arranged at random in a virtual three-dimensional space. For example, random coordinates may be acquired for each node that is to be arranged. For example, the node arranging unit 102 arranges nodes at random in a virtual three-dimensional space, according to a predesignated algorithm or the like. For example, the node arranging unit 102 may arrange nodes at random in a predesignated region in a virtual three-dimensional space. The region in this example is a three-dimensional region. The technique for arranging objects, coordinates, or the like at random in a virtual three-dimensional space is a known art, and, thus, a detailed description thereof has been omitted. Furthermore, the node arranging unit 102 may arrange nodes at random or in a predesignated order at connection points in a three-dimensional grid or in a predesignated coordinate group. The predesignated order is, for example, the order of numbers allocated to the node identifiers, the ascending order or the descending order of characters at the beginning of the node identifiers, the order in which the node identifiers are stored, or the like.

The node arranging unit 102 may arrange all nodes indicated by the node identifiers stored in the inter-node information, or may arrange only part of the nodes, in a virtual three-dimensional space. The node arranging unit 102 may arrange, for example, only nodes indicated by the inter-node information and satisfying a specific condition, in a virtual three-dimensional space. The number of nodes arranged in this manner is preferably three or more.

The specific condition is, for example, a condition that it is a node designated by the user, or a condition that it is a node excluding those designated by the user. A node designated by the user is, for example, a node indicated by one or more node identifiers accepted via an unshown accepting unit or the like by the node arranging apparatus 1. Accordingly, the node arranging unit 102 can arrange only nodes designated by the user, or can arrange only nodes excluding those designated by the user.

Furthermore, the specific condition is a condition that they are two nodes having a connection strength of a threshold value or more. The connection strength may be considered as the link strength. The threshold value may be stored in, for example, an unshown storage unit or the like, or may be held by an algorithm or the like for judging whether or not the condition is satisfied. Accordingly, the node arranging unit 102 can arrange only pairs of nodes having a high connection strength.

Furthermore, the specific condition is a condition that it is a node indicated by the inter-node information as being connected to other nodes in a number satisfying a predesignated condition. Specifically, the specific condition may be a condition that it is a node connected to other nodes in a number of less than a threshold value. The number of other nodes to which one node is connected may be considered as the number of other nodes indicated by the inter-node information as being connected to the one node. For example, the node arranging unit 102 detects, for each node identifier of a node that is to be arranged from among the nodes contained in the inter-node information, node identifiers of other nodes connected to the node indicated by this node identifier using the inter-node information, and judges that the node that is to be arranged is a node satisfying the condition if the detected number of node identifiers is less than a threshold value.

For example, in the case of arranging nodes associated with multiple components forming a product, a trial product, or the like, a substrate on which components are to be arranged, a casing, fluid such as air present in an environment where components are to be arranged, and the like are connected to a large number of components, and, thus, they make it difficult to view the image of a connection relationship of other components, and, in many cases, their connection relationship and the like are not of interest to the user. Accordingly, the above-described arrangement manner makes it possible to arrange only nodes associated with important components, for example, by omitting nodes to which a large number of other nodes are connected, such as nodes of substrates or fluid such as air, thereby making the connection relationship between the nodes easily viewable.

Note that the arranging only nodes satisfying a specific condition may be considered as a concept that encompasses the omitting nodes satisfying a condition designating a node that is to be omitted.

The node arranging unit 102 may be realized typically by an MPU, a memory, or the like. Typically, the processing procedure of the node arranging unit 102 is realized by software, and the software is stored in a storage medium such as a ROM. Note that the processing procedure may be realized also by hardware (a dedicated circuit).

The node moving unit 103 moves each node using a movement amount and a movement direction of that node determined by an arrangement relationship between that node arranged in the virtual three-dimensional space and a predesignated first plane, an arrangement relationship between that node arranged in the virtual three-dimensional space and another node arranged in the virtual three-dimensional space, and an arrangement relationship between that node arranged in the virtual three-dimensional space and at least one other node associated therewith by the inter-node information and arranged in the virtual three-dimensional space. The node moving unit 103 repeatedly performs once or at least twice the process that moves each node, until the predesignated condition is satisfied.

The first plane is any plane in the same virtual three-dimensional space as that in which the nodes are arranged. Examples of the first plane include an xy plane and the like. The first plane is typically a plane on which the position of the node that has been moved by the node moving unit 103 is to be projected, or a plane parallel to this plane.

The at least one other node associated with a node by the inter-node information is, for example, one or at least two other nodes indicated by the inter-node information as being connected to that node. An arrangement relationship between a node arranged in the virtual three-dimensional space and at least one other node arranged in the virtual three-dimensional space may be considered, for example, as an arrangement relationship between one node arranged in the virtual three-dimensional space and nodes excluding the one node arranged in the same virtual three-dimensional space, which is acquired for part or all of the nodes arranged in the virtual three-dimensional space. Note that the same is applied to the description below. The at least one other node associated with a node by the inter-node information and arranged in the virtual three-dimensional space is, for example, one or at least two other nodes, from among the nodes arranged in the virtual three-dimensional space, indicated by the inter-node information as being connected to the node that is to be moved. The node that is to be moved is each node arranged in the virtual three-dimensional space.

An arrangement relationship between a node and the first plane is, for example, information indicating the arrangement relationship between a node and the first plane. An arrangement relationship between a node and the first plane may be considered, for example, as information that can be acquired from information indicating an arrangement of that node, information indicating the first plane, and the like. An arrangement relationship between a node and the first plane is, for example, a distance of that node with respect to the first plane, a direction of that node with respect to the first plane, or a combination thereof. The direction of that node with respect to the first plane is, for example, a direction of a perpendicular line set from that node to the first plane, or a direction perpendicularly oriented from that node to the first plane. Furthermore, information on the direction of that node with respect to the first plane may be considered as information indicating, for example, which one of the two spaces (e.g., which one of the positive side and the negative side) that have been separated by the first plane includes that node, because this information as a result makes it possible to judge the direction of that node with respect to the first plane.

The arrangement relationship between nodes, such as the above-described arrangement relationship between a node arranged in the virtual three-dimensional space and at least one other node arranged in the virtual three-dimensional space is, for example, information indicating the arrangement relationship between the nodes. The arrangement relationship between the nodes may be considered, for example, as information that can be acquired from information indicating the arrangement of the nodes. The arrangement relationship between the nodes may be, for example, a distance between the nodes, a direction connecting the nodes (e.g., a direction, using one of the nodes as a reference, of the other node), or a combination thereof. For example, the information indicating the arrangement relationship between the nodes may be a vector from one of the nodes to the other node. For example, a vector obtained by subtracting, from a positional vector of one of the nodes, a positional vector of the other node may be considered as information indicating the arrangement relationship between the nodes. For example, the magnitude of this vector indicates a distance between the nodes, and the orientation of this vector indicates a direction, using one of the nodes as a reference, of the other node.

The movement amount of a node is a movement amount in the virtual three-dimensional space. The movement amount may be considered as a movement distance. In the case where the position of a node is represented by coordinates, moving a node may be considered as acquiring coordinates obtained by moving the coordinates of a node before movement, by the movement amount of that node, in the movement direction of that node.

Furthermore, the movement amount and the movement direction of a node may be represented, for example, as a vector indicating the movement amount and the movement direction of that node. In the case where the position of a node is represented by a positional vector, a positional vector of the node after movement may be represented as a sum of a positional vector of the node before movement and a vector indicating the movement amount and the movement direction of the node.

In this specific example, the case will be described in which the node moving unit 103 includes the first acquiring part 1031, the second acquiring part 1032, the third acquiring part 1033, the movement information acquiring part 1034, and the moving part 1035, and these constituent elements repeatedly perform once or at least twice the process that determines the movement amount and the movement direction of each node, and move the node. This process performed by these constituent elements will be described later in detail.

The above-described predesignated condition is a condition used to judge whether or not to repeat the process that moves each node. This condition in this case is referred to as an end condition. The end condition is, for example, the number of repetitions. For example, the node moving unit 103 repeatedly performs the process that moves each node until the number of repetitions is a predesignated number or more. When the number of repetitions reaches this number, the repetition is ended. Furthermore, the end condition is, for example, a condition that the maximum distance in the height direction from multiple nodes to the first plane is less than a predesignated distance. Furthermore, it may be a condition that a value indicating variation, in a direction parallel to the first plane, of the positions of multiple nodes is a predesignated value or more. Each time the node moving unit 103 performs the process that moves each node, the node moving unit 103 calculates a distance between a node having the largest height from the first plane and a node having the smallest height, and ends the repetition when the distance becomes less than a predesignated distance. Furthermore, the end condition may be a condition that the maximum movement amount of nodes is less than a predesignated value. The end condition may be any condition under which the repetition of the movement can be ended in a state where the nodes projected on the first plane are not too far from each other and not too close to each other.

According to findings obtained as a result of in-depth research of the present inventor, the repetition of the process that moves each node is preferably performed such that the movement amount of each node in each time of processing is smaller and the number of repetitions is larger. For example, the number of repetitions is preferably twice or more, such as 1000 times or more. The number of repetitions is preferably made larger such that the maximum movement amount of nodes is made smaller. If the time from when this process is started to when a node connection image is output is set to approximately one second, the number of repetitions is preferably 10000 times or less, more preferably 4000 to 6000 times. Furthermore, coefficients and the like of an equation for calculating a movement amount of nodes are preferably set such that, for example, the arrangement of the nodes does not diverge if the movement amount takes a maximum value. For example, if the distance in the vertical direction, the horizontal direction, and the height direction in a space in which a node is first arranged at random is set to "1" and the number of repetitions is set to 1000 to 10000 times, the maximum movement amount of nodes is preferably set to "0.0005" to "0.05". If the nodes are repeatedly moved in a small movement amount in this manner, links between the nodes can be prevented from crossing each other, and three or more successively connected nodes can be arranged substantially in the shape of a curve or straight line in which the amount of torsion or twist is small. Furthermore, a preferable degree of distribution between the nodes can be obtained.

The node moving unit 103 may be realized typically by an MPU, a memory, or the like. Typically, the processing procedure of the node moving unit 103 is realized by software, and the software is stored in a storage medium such as a ROM. Note that the processing procedure may be realized also by hardware (a dedicated circuit).

The first acquiring part 1031 acquires, for each node arranged in the virtual three-dimensional space, a first parameter, which is a parameter according to an arrangement relationship between that node and the first plane. The first parameter is a parameter having a magnitude and a direction. The first parameter is a parameter used to acquire a movement amount and a movement direction of each node. For example, the first acquiring part 1031 acquires, for each node arranged in the virtual three-dimensional space, the first parameter according to a distance and a direction of that node with respect to the first plane.

The first parameter may be, for example, a parameter indicating a movement amount and a movement direction of each node, or a parameter used to calculate a movement amount of a node, by being substituted for a predesignated arithmetic expression or the like as an argument such as a velocity or a force that is to be applied to an object or the like. Note that the same is applied to a second parameter and a third parameter described later.

For example, the first acquiring part 1031 acquires, for each node arranged in the virtual three-dimensional space, the first parameter having a magnitude that increases according to an increase in the distance to the first plane, and a direction approaching the first plane. The magnitude that increases according to an increase in the distance refers to a magnitude that does not decrease according to an increase in the distance, and refers to, for example, a magnitude that increases continuously or stepwise according to an increase in the distance. For example, the first acquiring part 1031 acquires the magnitude of the first parameter by substituting the distance to the first plane for an argument of an increasing function prepared in advance. If the first plane is an xy plane as described above, the distance between each node and the first plane may be considered, for example, as an absolute value of the z coordinate of that node.

For example, the first acquiring part 1031 acquires the first parameter having a direction perpendicular to the first plane and approaching the first plane. That is to say, the direction of the first parameter is, for example, a direction perpendicularly oriented toward the first plane.

If the node moving unit 103 repeatedly performs twice or more the process that moves each node, the first acquiring part 1031 preferably increases the magnitude of the first parameter each time the node moving unit 103 performs the process that moves the node. The reason for this is that, if the movement amount of each node in a direction toward the first plane is large from the very first, the node moves in the first plane direction before the node moves in another direction, so that links between the nodes may cross each other, or torsion may easily occur between three or more successively connected nodes. Note that this process in which the node moving unit 103 moves the node is, for example, a series of processes in which the first acquiring part 1031, the second acquiring part 1032, the third acquiring part 1033, the movement information acquiring part 1034, and the moving part 1035 acquire a movement information for each node arranged in the virtual three-dimensional space, and move that node.

The first acquiring part 1031 may be realized typically by an MPU, a memory, or the like. Typically, the processing procedure of the first acquiring part 1031 is realized by software, and the software is stored in a storage medium such as a ROM. Note that the processing procedure may be realized also by hardware (a dedicated circuit).

The second acquiring part 1032 acquires, for each node arranged in the virtual three-dimensional space, a second parameter, which is a parameter determined according to an arrangement relationship with respect to another node arranged in the same virtual three-dimensional space. The second parameter is a parameter having a magnitude and a direction. The second parameter is a parameter used to acquire a movement amount and a movement direction of each node. The second acquiring part 1032 acquires, for each node arranged in the virtual three-dimensional space, the second parameter, which is a parameter determined according to a distance and a direction with respect to another node arranged in the virtual three-dimensional space.

The second acquiring part 1032 acquires, for example, for one node arranged by the node arranging unit 102 in the virtual three-dimensional space, a magnitude and a direction according to the distance and the position with respect to each other node arranged in the same virtual three-dimensional space. Then, the parameters acquired for the respective other nodes are composited to acquire, for the one node, the second parameter having a magnitude and a direction. The same process is performed for each node arranged in the virtual three-dimensional space, so that the second parameter is acquired for each node arranged in the virtual three-dimensional space. The compositing in this case may be considered, for example, as compositing of vectors or the like. Note that the same is applied to other compositing below. The compositing of parameters acquired for the respective other nodes may be performed such that the parameters are composited at a time after movement amounts and movement directions of all of the other nodes are acquired or such that a parameter having a magnitude and a direction of one of the other nodes is sequentially composited each time the parameter is acquired.

The second acquiring part 1032 acquires, for example, for each node arranged in the virtual three-dimensional space, a parameter having a magnitude that increases according to a decrease in the inter-node distance with respect to each other node arranged in the virtual three-dimensional space, and a direction opposite from the other node. Then, the parameters acquired for the respective other nodes are composited to acquire the second parameter for each node. The other nodes in this case are nodes excluding the node for which a parameter is to be acquired, from among the nodes arranged in the virtual three-dimensional space. The magnitude that increases according to a decrease in the inter-node distance refers to a magnitude that does not decrease according to a decrease in the inter-node distance, and refers to, for example, a magnitude that increases continuously or stepwise according to a decrease in the distance. The direction opposite from another node refers to a direction indicated by a vector obtained by subtracting a positional vector of the other node from a positional vector of a node for which a parameter is to be acquired. Furthermore, the magnitude of the vector obtained by the subtraction may be used as the inter-node distance.

The second acquiring part 1032 may be realized typically by an MPU, a memory, or the like. Typically, the processing procedure of the second acquiring part 1032 is realized by software, and the software is stored in a storage medium such as a ROM. Note that the processing procedure may be realized also by hardware (a dedicated circuit).

The third acquiring part 1033 acquires, for each node arranged in the virtual three-dimensional space, a third parameter determined according to an arrangement relationship with respect to at least one other node associated with that node by the inter-node information and arranged in the same virtual three-dimensional space. The third parameter is a parameter having a magnitude and a direction. The third parameter is a parameter used to acquire a movement amount and a movement direction of each node. The third acquiring part 1033 acquires, for each node arranged in the virtual three-dimensional space, the third parameter determined according to a distance and a direction with respect to at least one other node associated with that node by the inter-node information and arranged in the virtual three-dimensional space. The state of nodes associated with each other may be considered as the state of nodes connected to each other as described above.

The third acquiring part 1033 acquires, for example, for one node arranged in the virtual three-dimensional space, a parameter having a magnitude and a direction according to the distance and the position with respect to each other node associated with that node by the inter-node information and arranged in the virtual three-dimensional space. Then, the parameters acquired for the respective other nodes are composited to acquire the third parameter for that node. The same process is performed for each node arranged in the virtual three-dimensional space, so that the third parameter is acquired for each node arranged in the virtual three-dimensional space. The other nodes in this case associated with one node by the inter-node information may be considered as other nodes associated with the one node by the inter-node information and arranged in the virtual three-dimensional space.

The third acquiring part 1033 acquires, for example, for each node arranged in the virtual three-dimensional space, a parameter having a magnitude that increases according to an increase in the magnitude of a difference between an inter-node distance and a predesignated first distance, with respect to each other node associated therewith by the inter-node information and arranged in the virtual three-dimensional space, and a direction according to a comparison result between the inter-node distance and the first distance. Then, the parameters acquired for the respective other nodes are composited to acquire the third parameter for that node. The direction according to the comparison result is a direction toward the other node if the comparison result indicates that the inter-node distance is larger than the first distance, and is a direction opposite from the other node if the comparison result indicates that the inter-node distance is smaller than the first distance. The direction opposite from the other node may be considered as a direction away from the other node. For example, if the inter-node distance is larger than the first distance, the third acquiring part 1033 acquires a parameter having a direction toward the other node. Furthermore, for example, if the inter-node distance is smaller than the first distance, the third acquiring part 1033 acquires a parameter having a direction opposite from the other node, that is, a direction away from the other node. The first distance may be considered as a threshold value. The acquiring a direction according to the comparison result between the inter-node distance and the first distance may be considered as acquiring a direction according to a difference between the inter-node distance and the first distance. The direction according to the difference is, for example, a direction toward the other node if the calculated difference indicates that the inter-node distance is larger than the first distance, and is a direction opposite from the other node if the calculated difference indicates that the inter-node distance is smaller than the first distance.

The third acquiring part 1033 may be realized typically by an MPU, a memory, or the like. Typically, the processing procedure of the third acquiring part 1033 is realized by software, and the software is stored in a storage medium such as a ROM. Note that the processing procedure may be realized also by hardware (a dedicated circuit).

The movement information acquiring part 1034 acquires movement information according to the first parameter, the second parameter, and the third parameter acquired for each node by the first acquiring part 1031, the second acquiring part 1032, and the third acquiring part 1033. The movement information is information indicating a movement amount and a movement direction of each node. For example, the movement information acquiring part 1034 composites the first parameter, the second parameter, and the third parameter acquired for each node, and acquires movement information using the composite parameter. The compositing of the first parameter, the second parameter, and the third parameter is, for example, compositing of vectors in the case where the first parameter, the second parameter, and the third parameter are respectively taken as vectors, and the magnitude and the direction of the composite vector are the magnitude and the direction of the composite parameter. For example, if all of the first parameter, the second parameter, and the third parameter are a parameter indicating a movement amount and a movement direction of a node, the movement information acquiring part 1034 acquires a parameter obtained by compositing these parameters, as the movement information. Furthermore, if none of the first parameter, the second parameter, and the third parameter is a parameter indicating a movement amount and a movement direction (e.g., if they are a parameter corresponding to a force and a velocity that are to be applied to an object as described above, etc.), the movement information acquiring part 1034 calculates, for example, the movement amount of the movement information, by substituting the magnitude of the composite parameter for an equation prepared in advance for calculating a movement amount using a composite parameter as an argument. In this case, the direction of the composite parameter is used as the movement direction of the movement information. If at least one or more of the first parameter, the second parameter, and the third parameter are not a parameter indicating a movement amount, each parameter not indicating a movement amount is substituted for an equation prepared in advance for calculating a movement amount using a parameter not indicating a movement amount as an argument, so that the movement amount corresponding to each parameter is calculated. Then, the first parameter, the second parameter, and the third parameter are composited, using the thus calculated movement amount and the originally held direction as a parameter indicating a movement amount and a movement direction of the parameter not indicating a movement amount, so that the movement amount and the movement direction indicated by the composite parameter can be acquired as the movement information.

The movement information acquiring part 1034 may be realized typically by an MPU, a memory, or the like. Typically, the processing procedure of the movement information acquiring part 1034 is realized by software, and the software is stored in a storage medium such as a ROM. Note that the processing procedure may be realized also by hardware (a dedicated circuit).

The moving part 1035 moves each node using the movement information acquired by the movement information acquiring part 1034. The moving each node may be considered as acquiring coordinates or a positional vector of that node after movement. For example, the moving part 1035 calculates coordinates obtained by moving the coordinates of one node, in the direction indicated by the movement information acquired for that node, by the movement amount indicated by the movement information. Then, the coordinates before movement are updated to the coordinates after movement. Furthermore, in the case where the position of a node is taken as a positional vector and the movement information as a vector, a positional vector indicating the position of a node after movement may be acquired by adding the vector that is the movement information acquired for that node to the positional information of the node. Then, the positional vector before movement is updated to the positional vector after movement.

The moving part 1035 may be realized typically by an MPU, a memory, or the like. Typically, the processing procedure of the moving part 1035 is realized by software, and the software is stored in a storage medium such as a ROM. Note that the processing procedure may be realized also by hardware (a dedicated circuit).

If the process that moves each node arranged by the node arranging unit 102, using the first acquiring part 1031, the second acquiring part 1032, the third acquiring part 1033, the movement information acquiring part 1034, and the moving part 1035 is taken as one moving process, in this Example, for example, this moving process is repeatedly performed once or at least twice until the end condition as described above is satisfied. Whether or not the end condition is satisfied is judged, for example, by the moving part 1035.

The moving process, except for the process that acquires the first parameter using the first acquiring part 1031, may be performed once or more during the time after when the node arranging unit 102 arranges a node and before when this moving process is performed, or while the moving process is being repeated. In the moving process except for the process that acquires the first parameter in this case, for example, the movement information acquiring part 1034 acquires movement information using the second parameter and the third parameter.

Furthermore, in the above-described process, instead of acquiring movement information using the first parameter, the second parameter, and the third parameter, the movement information acquiring part 1034 may acquire a movement amount and a movement direction corresponding to each of the first parameter, the second parameter, and the third parameter, using each of the parameters, and the moving part 1035 may move each node arranged in the virtual three-dimensional space such that the node is moved by the movement amount acquired for the first parameter in the movement direction acquired for the first parameter, is then moved by the movement amount acquired for the second parameter in the movement direction acquired for the second parameter, and is then moved by the movement amount acquired for the third parameter in the movement direction acquired for the third parameter. Furthermore, in the case where the first acquiring part 1031, the second acquiring part 1032, and the third acquiring part 1033 acquire a parameter indicating the movement amount and the movement direction of a node, the movement information acquiring part 1034 may be omitted, and the moving part 1035 may move each node in the movement direction indicated by each of the first parameter, the second parameter, and the third parameter by the movement amount indicated by each of the parameters.

Note that there is no limitation on the order or the like in which the processing parts forming the node moving unit 103 acquire, for each node, the first parameter, the second parameter, and the third parameter, acquire the movement information, and move each node using the acquired movement information.

For example, the processing order of the process in which the first acquiring part 1031 acquires the first parameter, the process in which the second acquiring part 1032 acquires the second parameter, and the process in which the third acquiring part 1033 acquires the third parameter, which are performed for one node, may be switched.

Furthermore, the process in which the first acquiring part 1031 acquires the first parameter, the process in which the second acquiring part 1032 acquires the second parameter, the process in which the third acquiring part 1033 acquires the third parameter, the process in which the movement information acquiring part 1034 acquires movement information, and the process in which the moving part 1035 moves a node using the acquired movement information may be continuously performed for one node, and these processes may be performed also for each node, so that each node is moved. In this case, movement of one node may be or may not be reflected in the second parameter and the third parameter, which are acquired for other nodes after that node is moved. For example, as the information on the position of a node that has been moved, which is used to acquire the second parameter and the third parameter, it is possible to use either information on the position after the movement or information on the position immediately before the movement.

The display information generating unit 104 generates display information for displaying a node connection image. The node connection image is an image in which nodes arranged in the virtual three-dimensional space are projected on a plane, and is an image in which nodes associated with each other by the inter-node information are connected to each other. The image in which nodes are projected is, for example, an image obtained by acquiring, in the case where each node arranged in the virtual three-dimensional space is projected on a plane, information on the position (e.g., coordinates, etc.) of that node on the plane, and arranging images, character strings, or the like associated with the respective nodes at the positions indicated by this positional information. Alternatively, this image is an image obtained by arranging objects such as node-indicating images, character strings, or three-dimensional models on the respective nodes arranged in the virtual three-dimensional space, and projecting them on a plane. The image on which nodes arranged in the virtual three-dimensional space are projected on a plane is, for example, an image obtained by rendering.

The plane is, for example, a predesignated plane. The predesignated plane is, for example, a plane in which the connection relationship between the nodes can be easily seen in the projected image. For example, the predesignated plane is preferably a plane parallel to the first plane, but may be a plane that is inclined by a predesignated angle (e.g., less than 45 degrees) with respect to a plane parallel to the first plane.

The image projected on the predesignated plane is, for example, an image obtained by projecting each node in a direction perpendicular to the predesignated plane. Alternatively, this image may be an image obtained by projecting each node from a predesignated point in a predesignated direction on a predesignated plane. The predesignated point is, for example, a point on a line that is perpendicular to the predesignated plane and ultimately passes through a centroid or a center of multiple nodes arranged in the virtual three-dimensional space. Furthermore, the predesignated plane is a plane perpendicular to the designated direction. The predesignated plane may be a plane designated by the user.

The image in which nodes associated with each other by the inter-node information are connected to each other is an image obtained by arranging, between two nodes indicated by the inter-node information as being connected to each other, an object such as an image (e.g., line) or a character string indicating that the nodes are connected to each other. For example, the image in which nodes are connected to each other is an image in which objects such as images or characters indicating the nodes are connected to each other by a line. If the inter-node information further indicates a connection direction between nodes, a line connecting the nodes or an image or a character string arranged between the nodes may have an arrow or the like indicating the connection direction. Furthermore, a line connecting the nodes or an image or a character string arranged between the nodes may be a band-like image or the like indicating the direction by means of gradation, a change in the color, or the like. For example, the image in which nodes are connected to each other with indication of the connection direction may be considered as a directed graph.

The display information is typically a node connection image. The node connection image is, for example, image information such as raster images or vector images. Note that there is no limitation on the data type or file format of the display information as long as the information can display a node connection image as described above. The display information may be information other than the image information, for example, such as information that can display a node connection image by performing rendering with particular application software such as a web browser or a dedicated viewer. For example, the display information may be information having information indicating the position (e.g., coordinates, etc.) in the case where each node arranged in the virtual three-dimensional space is projected on a plane, information indicating the arrangement position of an image connecting nodes or the like (e.g., coordinates of both ends of a line segment connecting the nodes, etc.), and information indicating node identifiers associated with the nodes or names of components, devices, or the like associated with the nodes. For example, the output unit 105, which will be described later, can generate and display a node connection image by arranging objects having predetermined shapes such as circles or rectangles designated in advance and information on the node identifiers and the like, at positions corresponding to the positions of nodes held by the display information, and further arranging a predesignated line segment, arrow, or the like, at positions according to the information indicating the arrangement position of an image connecting the nodes.

The display information generating unit 104 generates display information, for example, for nodes that have been repeatedly moved by the node moving unit 103. Specifically, if the node moving unit 103 judges that the above-described predesignated condition is satisfied, the display information is generated for multiple nodes arranged in the virtual three-dimensional space after the final movement by the node moving unit 103.

The display information generating unit 104 may be realized typically by an MPU, a memory, or the like. Typically, the processing procedure of the display information generating unit 104 is realized by software, and the software is stored in a storage medium such as a ROM. Note that the processing procedure may be realized also by hardware (a dedicated circuit).

The output unit 105 outputs the display information generated by the display information generating unit 104. The outputting the display information may be outputting the display information, or may be outputting a node connection image using the display information, such as displaying. For example, the output in this example is a concept that encompasses displaying on a display screen, projection using a projector, printing with a printer, transmission to an external apparatus, accumulation in a storage medium, delivery of a processing result to another processing apparatus or another program, and the like.

The output unit 105 may be considered to include or not to include an output device such as a display screen or communication means. The output unit 105 may be realized, for example, by driver software for an output device, a combination of driver software for an output device and the output device, or the like.

Hereinafter, an exemplary moving process that moves each node once using the first acquiring part 1031, the second acquiring part 1032, the third acquiring part 1033, the movement information acquiring part 1034, and the moving part 1035 of the node moving unit 103 will be described.

First, the process in which the first acquiring part 1031 acquires the first parameter will be described by way of an example. Below, the case will be described as an example in which the first parameter acquired for a node is a parameter that can be likened to an external force that is to be applied to a material. Accordingly, for the sake of convenience of the description, the first parameter in this example is referred to as an external force. Note that the external force does not have to be a force in the strict sense. Alternatively, it may be considered as a virtual force that is to be applied to a node. In this example, the case will be described in which the external force, that is, the first parameter is represented by a vector.

Here, a node identifier of one node that is to be moved from among the nodes arranged in the virtual three-dimensional space is taken as myid, and the coordinates of this node are taken as (myx, myy, myz). This one node is referred to as a node myid. It is assumed that the virtual three-dimensional space is formed by an x axis, a y axis, and a z axis that are orthogonal to each other.

An external force (pX, pY, pZ) that is to be applied to the node myid is acquired as follows.

$$\left. \begin{array}{l} pX = 0 \\ pY = 0 \\ pZ = -myz * f(t) \end{array} \right\} \quad (1)$$

In the equation, t=calccount/MAXCALCNUM. Note that "calccount" is a value indicating the number of times the process that moves each node is performed, which is set to 1 as the initial value, and is incremented by 1 each time the process that moves each node is performed once. "MAXCALCNUM" is a value for designating the number of times the moving process is repeated. The function f(t) is a function that is an increasing function if t>0, and is preferably an increasing function that is convex downward. For example, $f(t)=t^2$. The external force corresponds to, for example, a force that is to be applied in order to make the node myid close to the xy plane. With Equation (1) above, the first acquiring part 1031 acquires an external force, that is, a first parameter for one node.

Next, the process in which the second acquiring part 1032 acquires the second parameter will be described by way of an example. Below, the case will be described as an example in which the second parameter acquired according to the arrangement relationship between nodes is a parameter that can be likened to a Coulomb's force between the nodes. Accordingly, for the sake of convenience of the description, the second parameter in this example is referred to as a Coulomb's force. Note that the Coulomb's force does not have to be a Coulomb's force in the strict sense, and does not have to be a force in the strict sense. Alternatively, it may be considered as a virtual Coulomb's force generated between nodes. In this example, the case will be described in which the Coulomb's force, that is, the second parameter is represented by a vector.

Here, one of other nodes arranged in the same virtual three-dimensional space as the node myid is taken as a node yourid, and the coordinates of the node yourid are taken as (yourx, youry, yourz).

First, the second acquiring part 1032 calculates a vector (dx, dy, dz) oriented from the node myid toward the node yourid. The vector is acquired as follows.

$$dx = yourx - myx$$

$$dy = youry - myy$$

$$dz = yourz - myz$$

Next, the second acquiring part 1032 calculates a distance len between the node myid and the node yourid, from this vector.

$$\left. \begin{array}{l} len^2 = (dx*dx + dy*dy + dz*dz) \\ len = \sqrt{len^2} \end{array} \right\} \quad (2)$$

Next, the second acquiring part 1032 calculates a Coulomb's force that acts on the node myid. The Coulomb's force (qx, qy, qz) that acts on the node myid with respect to the node yourid is calculated as follows.

$$\left. \begin{array}{l} qx = -(\text{force}/len^2)*(dx/len) \\ qy = -(\text{force}/len^2)*(dy/len) \\ qz = -(\text{force}/len^2)*(dz/len) \end{array} \right\} \quad (3)$$

In the equation, "force" is a coefficient that can be freely set by the user in order to adjust the intensity of the Coulomb's force, and is, for example, "0.1".

The second acquiring part 1032 sequentially performs this process for the node myid also with respect to nodes other than the node yourid, and sequentially composites a Coulomb's force (qx, qy, qz) each time the Coulomb's force is acquired, thereby acquiring a second parameter, which is the Coulomb's force for the node myid. For example, assuming that a Coulomb's force obtained by compositing the Coulomb's forces acquired for the first to the k-th other nodes (k is an integer of 0 or more) is taken as $(qX_k, qY_k, qZ_k)$, and a Coulomb's force on the node myid acquired as described above for the (k+1)-th other node is taken as $(qx_{k+1}, qy_{k+1}, qz_{k+1})$, a Coulomb's force $(qX_{k+1}, qY_{k+1}, qZ_{k+1})$ obtained by compositing the Coulomb's forces acquired for the first to the (k+1)-th other nodes is represented as follows.

$$\left. \begin{array}{l} qX_{k+1} = qX_k + qx_{k+1} \\ qY_{k+1} = qY_k + qy_{k+1} \\ qZ_{k+1} = qZ_k + qz_{k+1} \end{array} \right\} \quad (4)$$

In the equation, $qX_0$, $qY_0$, and $qZ_0$ are 0.

Next, the process in which the third acquiring part 1033 acquires the third parameter will be described by way of an example. Below, the case will be described as an example in which the third parameter acquired according to the arrangement relationship between connected nodes is a parameter that can be likened to an elastic force that acts between the connected nodes. Note that the elastic force is taken as a force that acts on one node in the case where another node is fixed. The elastic force that acts between connected nodes is a force that, in the case where an inter-node distance is different from a predesignated first distance, acts in a direction in which the inter-node distance is returned to the first distance, with an intensity according to the absolute value of a length in the difference between these distances. The first distance is, for example, a distance corresponding to a natural length of an elastic member such as a spring connecting the nodes. Accordingly, for the sake of convenience of the description, the third parameter in this example is referred to as an elastic force. Note that the elastic force does not have to be an elastic force in the strict sense, and does not have to be a force in the strict sense. Alternatively, it may be considered as a virtual elastic force generated between nodes. In this example, the case will be described in which the elastic force, that is, the third parameter is represented by a vector.

Here, one of other nodes arranged in the same virtual three-dimensional space as the node myid and connected to the node myid is taken as a node cpid, and the coordinates of the node cpid are taken as (cpx, cxpy, cpz).

First, the third acquiring part 1033 calculates a vector (dx, dy, dz) oriented from the node myid toward the node cpid. The vector is acquired as follows.

$$dx = cpx - myx$$

$$dy = cpy - myy$$

$$dz = cpz - myz$$

Next, the third acquiring part 1033 calculates a distance len between the node myid and the node cpid, from this vector. The calculation equation is similar to Equation (2) above.

Next, the third acquiring part 1033 calculates an elastic force on the node myid. The elastic force (sx, sy, sz) that is applied to the node myid with respect to the node cpid is calculated as follows.

$$\left. \begin{array}{l} sx = (\text{forcecp}*(len - lenBase))*(dx/len) \\ sy = (\text{forcecp}*(len - lenBase))*(dy/len) \\ sz = (\text{forcecp}*(len - lenBase))*(dz/len) \end{array} \right\} \quad (5)$$

In the equation, "forcecp" is a coefficient corresponding to an elastic modulus, and is, for example, "0.1".

Furthermore, "lenBase" is the first distance, and may be considered as a distance at which the force of attraction and the force of repulsion between the node myid and the node cpid are balanced. In this example, "lenBase" is "0.3". This value may be considered as a value corresponding to a natural length of an elastic member such as a spring connecting the node myid and the node cpid.

The third acquiring part 1033 sequentially performs this process for the node myid also with respect to nodes other than the node cpid arranged in the virtual three-dimensional space and connected to the node myid, and sequentially composites an elastic force (sx, sy, sz) between nodes each time the elastic force is acquired, thereby acquiring a third parameter, which is the elastic force for the node myid. For example, assuming that an elastic force obtained by compositing the elastic forces acquired for the first to the k-th other nodes (k is an integer of 0 or more) is taken as $(sX_k, sY_k, sZ_k)$, and an elastic force on the node myid acquired as described above for the (k+1)-th other node is taken as $(sx_{k+1}, sy_{k+1}, sz_{k+1})$, an elastic force $(sX_{k+1}, sY_{k+1}, sZ_{k+1})$ obtained by compositing the elastic forces acquired for the first to the (k+1)-th other nodes is represented as follows.

$$sX_{k+1} = sX_k + sx_{k+1}$$
$$sY_{k+1} = sY_k + sy_{k+1}$$
$$sZ_{k+1} = sZ_k + sz_{k+1}$$
(6)

In the equation, $sX_0$, $sY_0$, $sZ_0$ are 0.

Next, the process in which the movement information acquiring part 1034 acquires movement information using the first parameter, the second parameter, and the third parameter will be described by way of an example.

First, the movement information acquiring part 1034 acquires a parameter obtained by compositing the first parameter, the second parameter, and the third parameter. For example, in Equations (1) to (6) above, the first parameter is taken an external force, the second parameter as a Coulomb's force, and the third parameter as an elastic force, and, thus, the parameter that is to be obtained is taken as a force obtained by compositing these forces.

Furthermore, a Coulomb's force obtained by sequentially compositing the Coulomb's forces acquired for all other nodes for the node myid using Equation (4) is taken as (qX, qY, qZ). In a similar manner, an elastic force obtained by sequentially compositing the elastic forces acquired for all other nodes for the node myid using Equation (6) is taken as (sX, sY, sZ).

The movement information acquiring part 1034 composites the external force that is the first parameter acquired for the node myid, the Coulomb's force that is the second parameter, and the elastic force that is the third parameter, thereby acquiring a composite force (fX, fY, fZ) as below. That is to say, the following force is acquired.

$$fX = pX + qX + sX$$
$$fY = pY + qY + sY$$
$$fZ = pZ + qZ + sZ$$
(7)

Then, this composite force is used to acquire movement information (mvX, mvY, mvZ) indicating a movement amount and a movement direction as below. That is to say, the following information is acquired.

$$mvX = dt * fX$$
$$mvY = dt * fY$$
$$mvZ = dt * fZ$$
(8)

In the equation, "dt" is a coefficient used to acquire movement information from the composite force, and is, for example, "0.05"

Next, the process that moves the node using the movement information acquired by the movement information acquiring part 1034 will be described by way of an example.

The movement information acquiring part 1034 acquires coordinates ($myX_{af}$, $myY_{af}$, $myZ_{af}$) of the node myid after movement, by adding the coordinates (myX, myY, myZ) of the node myid and the movement information (mvX, mvY, mvZ) acquired by Equation (4). That is to say, the coordinates are acquired as follows.

$$myX_{af} = myX + dt * fX$$
$$myY_{af} = myY + dt * fY$$
$$myZ_{af} = myZ + dt * fZ$$
(9)

In this manner, the moving process that moves once each node arranged in the virtual three-dimensional space is ended. If the moving process is repeated, in the next moving process, the coordinates ($myX_{af}$, $myY_{af}$, $myZ_{af}$) of the node myid after movement may be used as the coordinates of the node myid that is to be moved.

Note that, in the equations above, the coefficients and the like may be changed as appropriate. Furthermore, the equations above may be replaced by equations having similar relationship between an argument in the equations and a value that is to be calculated, such as equations having a similar increasing tendency, decreasing tendency, or the like.

Figure 2:
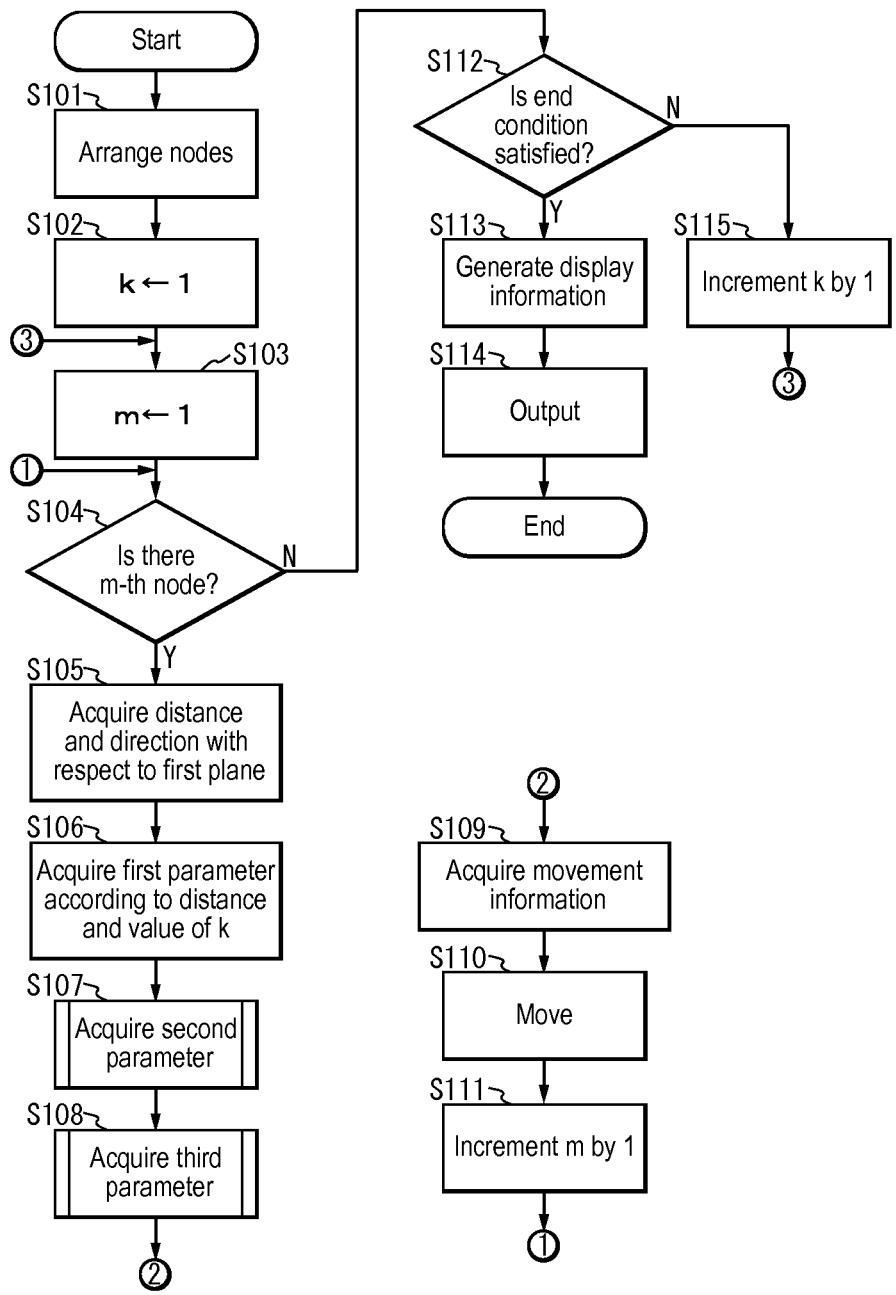
FIG. 2 is a flowchart illustrating an operation of the node arranging apparatus in the Example.

Next, an exemplary operation of the node arranging apparatus 1 will be described with reference to the flowchart in FIG. 2.

(Step S101) The node arranging unit 102 arranges, in the virtual three-dimensional space, nodes respectively indicated by multiple node identifiers in the inter-node information. For example, the node arranging unit 102 arranges nodes at random. Note that only nodes satisfying a specific condition may be arranged.

(Step S102) The moving part 1035 substitutes 1 for a counter k.

(Step S103) The moving part 1035 substitutes 1 for a counter m.

(Step S104) The first acquiring part 1031 judges whether or not there is an m-th node, in the nodes arranged in the virtual three-dimensional space. If there is the node, the procedure advances to step S105, and, if not, the procedure advances to step S112.

(Step S105) The first acquiring part 1031 acquires information indicating a distance of the m-th node with respect to the first plane and a direction of that node arranged with respect to the first plane. For example, if the first plane is an xy plane, a value of the z coordinate of the m-th node is acquired. The absolute value of the z coordinate indicates the distance to the first plane, and the sign of the z coordinate indicates the direction of that node arranged with respect to the first plane. For example, the sign of the z coordinate being positive indicates that the direction of the node has been set such that the node has a larger value on the z axis than the first plane has.

(Step S106) The first acquiring part 1031 acquires a first parameter according to the distance acquired in step S105 for the m-th node and the value of the counter k. For example, the first parameter is acquired using Equation (1) above.

(Step S107) The second acquiring part 1032 performs the process that acquires a second parameter for the m-th node. This process will be described later in detail.

(Step S108) The third acquiring part 1033 performs the process that acquires a third parameter for the m-th node. This process will be described later in detail.

(Step S109) The movement information acquiring part 1034 acquires movement information for the m-th node using the first parameter, the second parameter, and the third parameter acquired in steps S106 to S108. For example, the movement information is acquired using Equations (7) and (8) above.

(Step S110) The moving part 1035 moves the m-th node using the movement information acquired in step S109. For example, the moving part 1035 acquires coordinates after movement using Equation (9) above.

Note that, before the counter k is incremented, the coordinates of the m-th node and the like used in step S107 or S108 may be the coordinates and the like before movement. In this case, the coordinates after movement may be temporarily stored, for example, in an unshown storage unit or the like, and the moving part 1035 may update the coordinates before movement by reading the coordinates after movement, for example, at the time when the counter k is incremented. Note that the coordinates of the m-th node and the like used in step S107 or S108 may be the coordinates and the like after movement.

(Step S111) The moving part 1035 increments the counter m by 1. Then, the procedure returns to step S104.

(Step S112) The moving part 1035 judges whether or not the end condition is satisfied. For example, the moving part 1035 judges whether or not the value of the counter k is a predesignated value or more. If the value is the predesignated value or more, it is judged that the end condition is satisfied. If the end condition is satisfied, the procedure advances to step S113, and, if not, the procedure advances to step S115.

(Step S113) The display information generating unit 104 generates display information for displaying a node connection image of the nodes arranged in the virtual three-dimensional space.

(Step S114) The output unit 105 outputs the display information generated in step S113. Then, the process is ended.

(Step S115) The moving part 1035 increments the counter k by 1. Then, the procedure returns to step S103.

Figure 3:
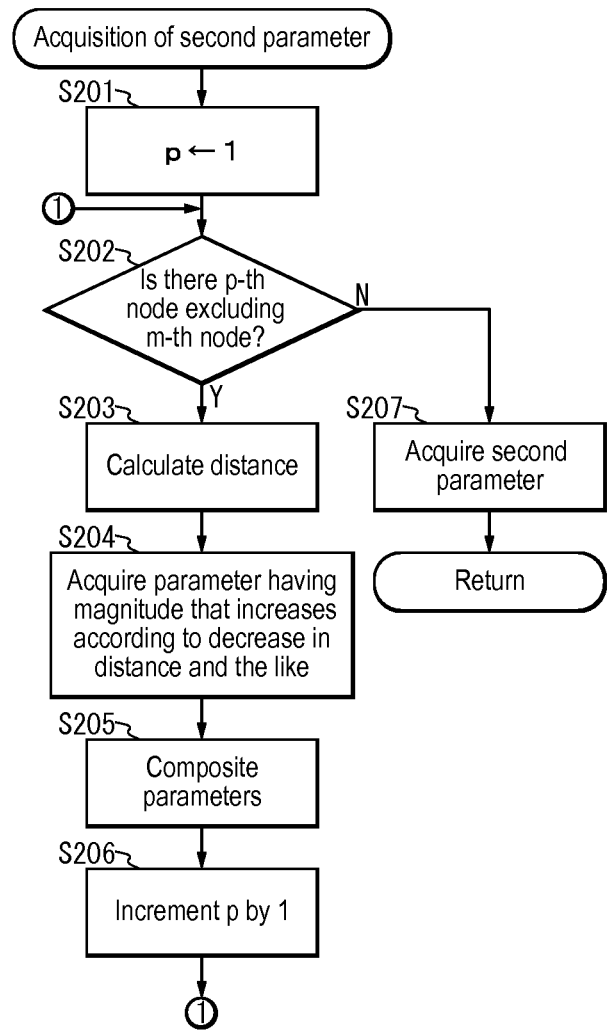
FIG. 3 is a flowchart illustrating an operation of the node arranging apparatus in the Example.

Next, an exemplary process in which the node arranging apparatus 1 acquires the second parameter will be described with reference to the flowchart in FIG. 3. This process is a process corresponding to step S107.

(Step S201) The second acquiring part 1032 substitutes 1 for a counter p.

(Step S202) The second acquiring part 1032 judges whether or not there is a p-th node, in the nodes excluding the m-th node and arranged in the virtual three-dimensional space. If there is the node, the procedure advances to step S203, and, if not, the procedure advances to step S207.

(Step S203) The second acquiring part 1032 calculates a distance between the m-th node and the p-th node. For example, the second acquiring part 1032 subtracts a positional vector of the m-th node from a positional vector of the p-th node, and calculates the distance using Equation (2) above together with the subtraction result.

(Step S204) The second acquiring part 1032 acquires a parameter having a magnitude that increases according to a decrease in the distance from the p-th node and a direction opposite from the p-th node, using the distance calculated in step S203. A parameter having a magnitude that decreases according to an increase in the distance is acquired. For example, the second acquiring unit 1032 acquires the parameter using Equation (3). This parameter may be considered as a parameter used to acquire a second parameter.

(Step S205) The second acquiring part 1032 composites a value obtained by compositing the parameters sequentially acquired for the nodes up to the (p−1)-th node, and the parameter acquired in step S204 for the p-th node. Then, the composite parameter is temporarily stored in an unshown storage unit or the like. The temporarily storing is, for example, updating. If p=1, it is sufficient that merely the parameter acquired in step S204 is temporarily stored.

(Step S206) The second acquiring part 1032 increments the counter p by 1. Then, the procedure returns to step S202.

(Step S207) The second acquiring part 1032 acquires, as the second parameter, the composite parameter temporarily stored in the unshown storage unit or the like, that is, the composite parameter obtained in step S205 immediately before and temporarily stored in the unshown storage unit or the like, and accumulates the obtained parameter in the unshown storage unit or the like. The procedure returns to the upper-level processing.

Figure 4:
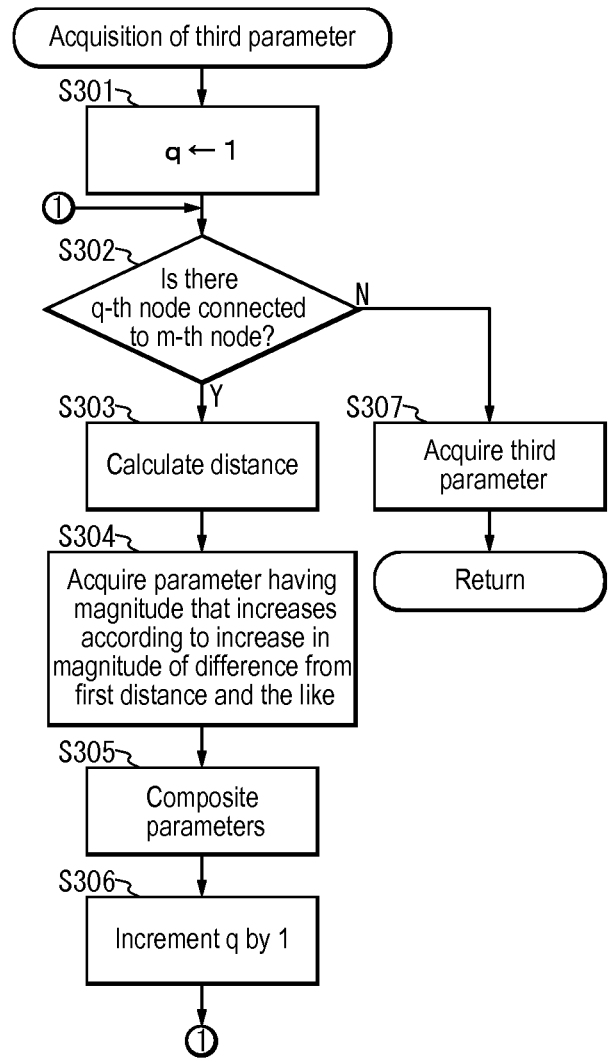
FIG. 4 is a flowchart illustrating an operation of the node arranging apparatus in the Example.

Next, an exemplary process in which the node arranging apparatus 1 acquires the third parameter will be described with reference to the flowchart in FIG. 4. This process is a process corresponding to step S108.

(Step S301) The third acquiring part 1033 substitutes 1 for a counter q.

(Step S302) The third acquiring part 1033 judges whether or not there is a q-th node connected to the m-th node, in the nodes excluding the m-th node and arranged in the virtual three-dimensional space. Whether or not a node arranged in the virtual three-dimensional space is connected to the m-th node is judged using the inter-node information. If there is the q-th node, the procedure advances to step S303, and, if not, the procedure advances to step S307.

(Step S303) The third acquiring part 1033 calculates a distance between the m-th node and the q-th node. For example, the third acquiring part 1033 subtracts a positional vector of the m-th node from a positional vector of the q-th node, and calculates the distance using Equation (2) above together with the subtraction result.

(Step S304) The third acquiring part 1033 acquires a parameter having a magnitude that increases according to an increase in the magnitude of a difference between the distance from the q-th node and a predesignated first distance, and a direction according to a comparison result between the inter-node distance and the first distance, using the distance calculated in step S303. For example, the parameter is acquired by substituting the distance acquired in step S303 for Equation (5) above. This parameter may be considered as a parameter used to acquire a third parameter.

(Step S305) The third acquiring part 1033 composites a value obtained by compositing the parameters sequentially acquired for the nodes up to the (q−1)-th node, and the parameter acquired in step S304 for the q-th node. Then, the composite parameter is temporarily stored in an unshown storage unit or the like. The temporarily storing is, for example, updating. If q=1, it is sufficient that merely the parameter acquired in step S304 is temporarily stored.

(Step S306) The third acquiring part 1033 increments the counter q by 1. Then, the procedure returns to step S302.

(Step S307) The third acquiring part 1033 acquires, as the third parameter, the composite parameter temporarily stored in the unshown storage unit or the like, that is, the composite parameter obtained in step S305 immediately before and temporarily stored in the unshown storage unit or the like, and accumulates the obtained parameter in the unshown storage unit or the like. The procedure returns to the upper-level processing.

Hereinafter, a specific operation of the node arranging apparatus 1 in this Example will be described by way of examples.

In this specific example, the case will be described as an example in which node identifiers of nodes associated with multiple components subjected to a heat transmission simulation are stored in the inter-node information storage unit 101.

Specific Example 1

Figure 5:
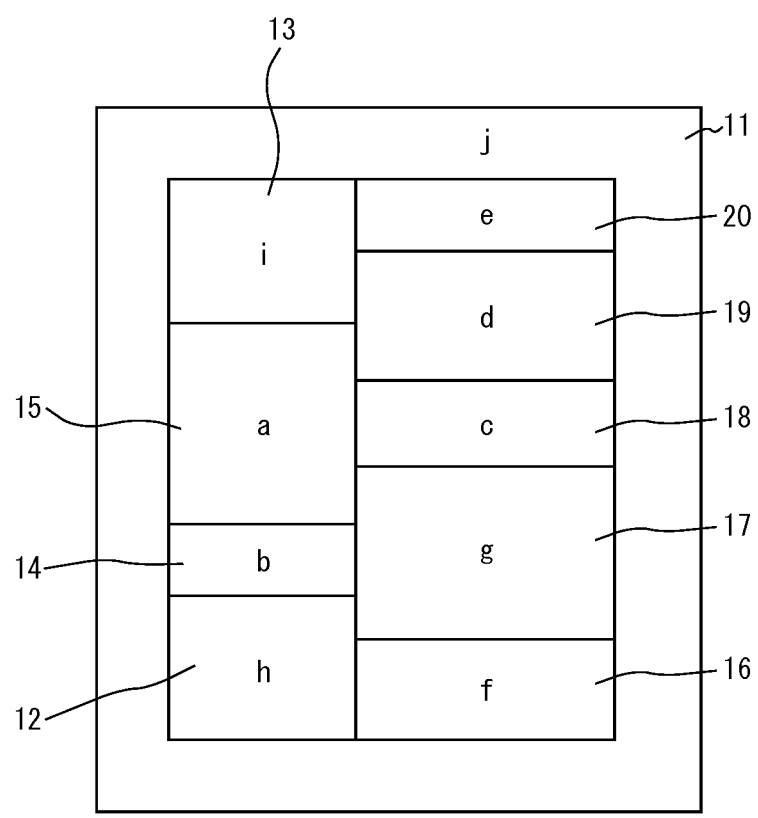
FIG. 5 is a schematic plan view showing the arrangement between components associated with nodes, illustrating inter-node information of the node arranging apparatus in the Example.

FIG. 5 is a schematic plan view showing the arrangement between components subjected to a heat transmission simulation. In this example, ten components 11 to 20 are arranged such that each component is in contact with one or more other components. It is assumed that, in the drawings, "a" to "j" denote component names. The component 11 with the component name "j" is a fluid arranged around the components 12 to 20. In this example, the fluid is also regarded as a component.

FIG. 6 is an inter-node information management table for managing the inter-node information stored in the inter-node information storage unit 101. The inter-node information is inter-node information regarding the nodes associated with the multiple components shown in FIG. 5, and, for example, is information having information obtained by the heat transmission simulation between the multiple components.

The inter-node information has attributes "node ID", "component name" "contact node ID", and "amount of heat transmitted". The "node ID" is a node identifier, and, for example, is a number allocated to each component. In this example, it is assumed that "011" to "020" of "node ID" are respectively the node identifiers of the components 11 to 20. The "component name" is a component name associated with the node, and, in this example, is one of the component names "a" to "j". The "contact node ID" is a node identifier of a component that is in contact with the component indicated by "node ID", and, in this example, the same node identifier for "node ID" is used.

The "amount of heat transmitted" is an amount of heat transmitted from the component indicated by "node ID" substantially to the component indicated by "contact node ID", and, here, as an example, is a value obtained by subtracting the amount of heat transmitted from the component indicated by "node ID" to the component indicated by "contact node ID", from the amount of heat transmitted from the component indicated by "contact node ID" to the component indicated by "node ID" (i.e., the amount of heat received by the component indicated by "node ID). The unit for the amount of heat is "W (watt)". Note that there is no limitation on the unit and the like. The value being negative indicates that the amount of heat is as a result transmitted from the component indicated by "node ID" to the component indicated by "contact node ID", and the value being positive indicates that the amount of heat is as a result transmitted from the component indicated by "contact node ID" to the component indicated by "node ID". The magnitude of the "amount of heat transmitted" may be considered as information indicating the link strength between nodes.

Note that, for example, if the "node ID" has an attribute value of "011", this attribute value may be referred to as a node ID "011". The same is applied to a combination of another attribute and an attribute value.

It is assumed that the attribute value of the "amount of heat transmitted" is, for example, a value acquired by the heat transmission simulation or the like. This sort of heat transmission simulation is a known art, and, thus, a detailed description thereof has been omitted.

First, the user gives an instruction to generate a node connection image using inter-node information, via an unshown input device or the like, to the node arranging apparatus 1.

The node arranging unit 102 arranges, in the virtual three-dimensional space, nodes stored in the inter-node information management table shown in FIG. 6.

For example, assuming that a specific condition that nodes excluding a node to which the largest number of other nodes are connected are to be output is predesignated, nodes satisfying this specific condition are detected. That is to say, nodes excluding a node to which the largest number of other nodes are connected are detected. This specific condition may be stored, for example, in an unshown storage unit as information for setting the condition. The information for setting the condition is configured, for example, by one or more functions, method names, control flow statements such as "if" or "then" statements, or the like. Furthermore, the information for setting this condition may be an algorithm for performing a judging process or the like corresponding to this condition.

First, the node arranging unit 102 counts, for each node in the inter-node information management table shown in FIG. 6, the number of other nodes connected thereto. The node arranging unit 102 counts, for example, for each value of "node ID", the number of records (rows) having the same value of "node ID" in the inter-node information management table shown in FIG. 6, and acquires the value of "node ID" having the largest count value. Since records in the inter-node information management table indicate that one node indicated by "node ID" and one node indicated by "contact node ID" are connected to each other, counting the number of records for each "node ID" refers to acquiring the number of other nodes connected to the node indicated by "node ID". Thus, the node arranging unit 102 acquires "node ID" having the largest number of nodes connected thereto. It is assumed that, for example, the number of other nodes connected to the node with "node ID" being "011" is "9", which is larger than the number for the other nodes, and, thus, the node arranging unit 102 acquires the node ID "011" of that node. Then, the node arranging unit 102 judges that nodes excluding the node indicated by the acquired node ID "011" are nodes satisfying the above-described specific condition, and determines to arrange these nodes.

The node arranging unit 102 acquires the values of "node ID" without overlaps from among records excluding the record (row) with "node ID" being "011" in the inter-node information management table shown in FIG. 6, and arranges at random, in the virtual three-dimensional space, nodes corresponding to the acquired values of "node ID". Specifically, random coordinates for each "node ID" of "012" to "020" are acquired. The random coordinates can be acquired, for example, using a rand function of C language or the like. The acquired coordinates are, for example, random coordinates positioned within a predesignated range from the origin of a virtual three-dimensional space including an x axis, a y axis, and a z axis that are orthogonal to each other. The acquired coordinates are accumulated in association with node identifiers in an unshown storage unit.

FIG. 7 is a node arrangement management table for managing the coordinates acquired for each node by the node arranging unit 102 in the virtual three-dimensional space. The node arrangement management table has "node ID" and "coordinates". The "coordinates" are coordinates indicating the position at which the node indicated by the associated "node ID" is arranged. Note that the values of $x_{111}$, $y_{111}$, $z_{111}$, and the like in "coordinates" are any numerical values.

Figure 8:
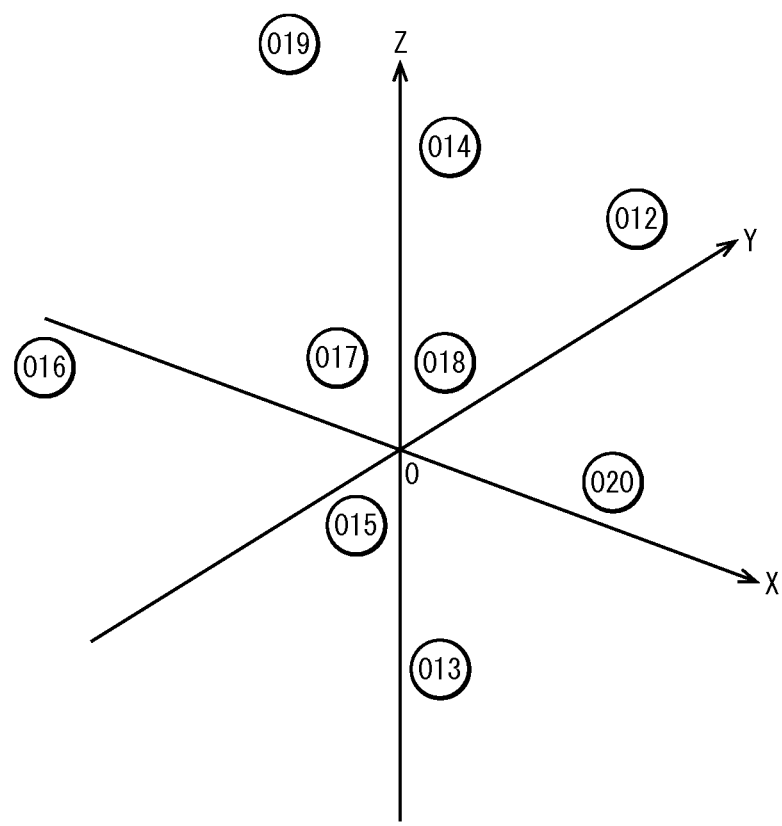
FIG. 8 is a diagram illustrating nodes arranged in the virtual three-dimensional space according to the node arranging apparatus in the Example.

FIG. 8 is a diagram illustrating the nodes arranged by the node arranging unit 102 in the virtual three-dimensional space, showing the state in which the nodes shown in the node arrangement management table are arranged at the coordinates associated with the nodes in the virtual three-dimensional space. In the drawing, for the sake of the description, the coordinate axes are shown. Furthermore, each node is indicated as a circular graphic. The number in each circular graphic indicates the node identifier associated with that node.

Next, the node moving unit 103 performs once or more the process that moves each node arranged by the node arranging unit 102, until an end condition is satisfied. For example, the end condition is a condition that the process is repeated 4000 times or more.

First, the moving part 1035 substitutes an initial value "1" for a counter in order to count the number of times the moving process that moves each node is performed.

Next, the first acquiring part 1031 acquires a first node identifier from the node arrangement management table shown in FIG. 9. For example, "012", which is the value of "node ID" of a record in the uppermost row, is read.

The first acquiring part 1031 acquires information indicating a distance and a direction of the node with the node ID being "012" with respect to the first plane. In this example, assuming that the first plane is predesignated as an xy plane, the first acquiring part 1031 acquires the value "$z_{112}$" of the z coordinate of the node with the node ID being "012", as the information indicating a distance and a direction with respect to the first plane, from the node arrangement management table shown in FIG. 7. Note that the node with the node ID being "012" may be referred to as a node "012". The same is applied to the other nodes.

The first acquiring part 1031 acquires the acquired value "$z_{112}$" of the z coordinate, the value "1" of the counter for counting the number of times the moving process is performed, and the value "4000" of the end condition, and substitutes these values for Equation (1) above, thereby acquiring a first parameter (pX, pY, pZ). In the equation, pX and pY are "0". Furthermore, if $f(t)=t^2$ in Equation (1), $pZ=-z_{112}*(1/4000)^2$. Since pZ is negative if $z_{112}$ is positive, and pZ is positive if $z_{112}$ is negative, the direction of the first parameter is always a direction perpendicularly approaching the xy plane that is the first plane.

Next, the second acquiring part 1032 acquires the first node identifier excluding the node identifier "012" from the node arrangement management table shown in FIG. 7. In this example, the node identifier "013" in the second row of the node arrangement management table shown in FIG. 7 is acquired.

The second acquiring part 1032 acquires "coordinates" ($x_{113}$, $y_{113}$, $z_{113}$) of the node "013" and "coordinates" ($x_{112}$, $y_{112}$, $z_{112}$) of the node "012". Then, taking the acquired coordinates as positional vectors of the nodes, the coordinates corresponding to the positional vector of the node "012" is subtracted from the coordinates corresponding to the positional vector of the node "013". Then, the components of the vector ($x_{113}-x_{112}$, $y_{113}-y_{112}$, $z_{113}-z_{112}$) obtained by the subtraction are substituted for Equation (2) above, to calculate a distance len between the node "013" and the node "012". The thus calculated len and the calculated vector are substituted for Equation (3), to acquire a parameter (qx, qy, qz). This parameter may be considered as a parameter used to acquire the second parameter. Since the thus acquired parameter is a parameter acquired for the first node excluding the node "012", the acquired parameter is temporarily stored by the second acquiring part 1032 in an unshown storage unit.

Furthermore, the second acquiring part 1032 acquires the second node identifier excluding the node identifier "012" from the node arrangement management table shown in FIG. 7. In this example, the node identifier "014" in the third row of the node arrangement management table shown in FIG. 7 is acquired. Then, in a similar manner to the above, the second acquiring part 1032 calculates a parameter (qx, qy, qz) of the node "012" using a distance between the node "014" and the node "012" and the like. Then, the acquired parameter is composited with the parameter acquired for the node "012" as shown in Equation (4), and is accumulated in an unshown storage unit.

In a similar manner, the second acquiring part 1032 sequentially calculates a parameter as described above also for the third and subsequent node identifiers excluding the node identifier "012", and sequentially composites the calculated parameter with the parameter obtained by compositing performed immediately before. The composite parameter (qX, qY, qZ) stored when the process that acquires and composites parameters for all nodes other than the node identifier "012" in the node arrangement management table shown in FIG. 7 is ended is the second parameter.

Next, the third acquiring part 1033 acquires the first node identifier excluding the node identifier "012" from the node arrangement management table shown in FIG. 7. In this example, the node identifier "013" in the second row of the node arrangement management table shown in FIG. 7 is acquired.

The third acquiring part 1033 judges whether or not there is a record (row) with "node ID" being "012" and "contact node ID" being "013" in the inter-node information management table shown in FIG. 6, in order to judge whether or not the node "013" is a node connected to the node "012"

If such a record is not detected, the process that acquires a parameter used to acquire the third parameter is not performed on the node "013".

Next, the third acquiring part 1033 acquires the second node identifier excluding the node identifier "012" from the node arrangement management table shown in FIG. 7. In this example, the node identifier "014" in the third row of the node arrangement management table shown in FIG. 7 is acquired. Then, in a similar manner to the above, it is judged whether or not there is a record (row) with "node ID" being "012" and "contact node ID" being "014" in the inter-node information management table shown in FIG. 6.

In this example, if there is a record (row) with "node ID" being "012" and "contact node ID" being "014" in the inter-node information management table shown in FIG. 6, the third acquiring part 1033 acquires "coordinates" ($x_{114}$, $y_{114}$, $z_{114}$) of the node "014" and "coordinates" ($x_{112}$, $y_{112}$, $z_{112}$) of the node "012". Then, taking the acquired coordinates as positional vectors of the nodes, the coordinates corresponding to the positional vector of the node "012" is subtracted from the coordinates corresponding to the positional vector of the node "014". Then, the components of the vector obtained by the subtraction are substituted for Equation (2) above, to calculate a distance len between the node "014" and the node "012". The thus calculated len and the calculated vector are substituted for Equation (5), to acquire a parameter (sx, sy, sz). This parameter may be considered as a parameter used to acquire the third parameter. Since the thus acquired parameter is a parameter acquired first for the node excluding the node "012", the acquired parameter is temporarily stored by the third acquiring part 1033 in an unshown storage unit.

Furthermore, the third acquiring part 1033 acquires the third node identifier excluding the node identifier "012" from the node arrangement management table shown in FIG. 7. In this example, the node identifier "015" in the fourth row of the node arrangement management table shown in FIG. 7 is acquired. Then, in a similar manner to the above, the third acquiring part 1033 judges whether or not there is a record (row) with "node ID" being "012" and "contact node ID" being "015" in the inter-node information shown in FIG. 6. If such a record is not detected, the process that acquires a parameter used to acquire the third parameter is not performed on the node "015".

Next, the third acquiring part 1033 performs a similar judging process on the fourth node identifier "016" excluding the node identifier "012". In this example, if there is a record (row) with "node ID" being "012" and "contact node ID" being "016" in the inter-node information management table shown in FIG. 6, the third acquiring part 1033 acquires a parameter used to acquire the third parameter in a similar manner to the above. Then, the acquired parameter is composited with the parameter acquired for the node "012" as shown in Equation (6), and is accumulated in an unshown storage unit.

In a similar manner, the third acquiring part 1033 judges whether or not there is a record (row) with "node ID" being "012" and "contact node ID" being the acquired node identifier in the inter-node information shown in FIG. 6, also for the fifth and subsequent node identifiers excluding the node identifier "012", and, if there is, sequentially calculates a parameter as described above, and sequentially composites the calculated parameter with the parameter obtained by compositing performed immediately before. The composite parameter (sX, sY, sZ) stored when the process that acquires and composites parameters for all nodes other than the node identifier "012" in the node arrangement management table shown in FIG. 7 is ended is the third parameter.

The movement information acquiring part 1034 substitutes the first parameter, the second parameter, and the third parameter acquired for each node by the first acquiring part 1031, the second acquiring part 1032, and the third acquiring part 1033 for Equation (7) above, to acquire a composite parameter (fX, fY, fZ), and further substitutes this composite parameter for Equation (8) above, to acquire movement information (mvX, mvY, mvZ).

The moving part 1035 moves the position of the node "012" arranged in the virtual three-dimensional space, using this movement information and the coordinates of the node "012". Specifically, the movement information and the current coordinates of the node "012" are substituted for Equation (9) above, to acquire coordinates of the node "012" after movement. If the acquired coordinates after movement are $(x_{212}, y_{212}, z_{212})$, the acquired coordinates after movement are temporarily stored by the moving part 1035 in association with the node ID "012" in an unshown storage unit or the like.

The first acquiring part 1031, the second acquiring part 1032, the third acquiring part 1033, the movement information acquiring part 1034, and the moving part 1035 perform the processes as described above sequentially on the second and subsequent nodes in the node arrangement management table shown in FIG. 7, to acquire coordinates after movement for each node. The acquired coordinates after movement are temporarily stored in association with the node identifiers in the unshown storage unit. If the coordinates after movement have been acquired for all nodes in the node arrangement management table shown in FIG. 7, the values of "coordinates" of all nodes in the node arrangement management table shown in FIG. 7 are updated to the coordinates after movement. For example, overwriting is performed.

FIG. 9 is a diagram showing a node arrangement management table after update.

Then, the moving part 1035 judges whether or not the predesignated end condition is satisfied. In this example, it is judged whether or not the value of the counter is "4000" or more. In this case, since the value of the counter is "1" and has not reached "4000", it is judged that the end condition is not satisfied. Then, the value of the counter is incremented by 1, and the moving process is repeated.

When the moving process is repeated and the value of the counter has reached "4000", the moving part 1035 judges that the end condition is satisfied. In this case, the coordinates of the nodes are distributed at positions close to the xy plane. Furthermore, nodes that are connected to each other are arranged close to each other, and nodes that are not connected to each other are arranged away from each other.

Accordingly, the display information generating unit 104 projects, on the xy plane parallel to the z axis, the finally obtained coordinates of the nodes of the node arrangement management table, to acquire the coordinates on the xy plane associated with the nodes, and generates, as the display information, image data of a node connection image in which predesignated circular graphics and "component name" associated with the node identifiers of the nodes acquired from the inter-node information management information in FIG. 6 are arranged at the coordinates associated with the nodes. It is assumed that the node connection image is an image in which nodes that are connected to each other, that is, nodes respectively indicated by "node ID" and "contact node ID" of the same record in the inter-node information management information in FIG. 6 are connected by a line having an arrow. The orientation of the arrow is determined by the sign of "amount of heat transmitted" in the inter-node information management information in FIG. 6. If the sign is positive, heat is transmitted toward the component associated with the node indicated by "node ID", and, thus, the arrowhead of the arrow is provided on the side of the node indicated by "node ID". If the sign is negative, the arrowhead of the arrow is provided on the side of the node indicated by "contact node ID". Furthermore, the line has a thickness that is proportional to the absolute value of the amount of heat transmitted.

The output unit 105 outputs the display information generated by the display information generating unit 104. In this example, the output unit 105 displays a node connection image indicated by the display information generated by the display information generating unit 104, using an unshown monitor.

Figure 10:
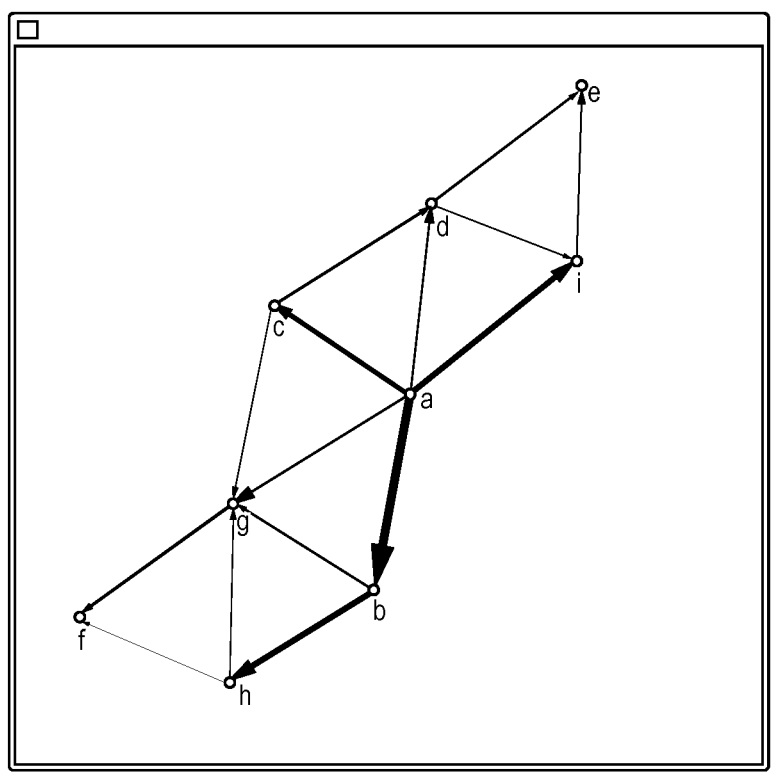
FIG. 10 is a diagram showing a display example of the node arranging apparatus in the Example.

FIG. 10 is a diagram showing an example in which the output unit 105 displays a node connection image.

In this specific example, in the virtual three-dimensional space, the node arranging unit 102 has omitted only the node with "node ID" being "011" to which the largest number of other nodes are connected, but it is also possible, for example, to omit only nodes to which nodes in the number at a threshold value or more are connected. Furthermore, for example, it is also possible to arrange, in the virtual three-dimensional space, only nodes excluding those designated by the user. Then, the above-described process may be performed only with the arranged nodes, thereby generating display information of a node connection image.

For example, if the user gives, using an unshown input device or the like, an instruction to exclude the node with "node ID" being "017" from nodes that are to be arranged in a node connection image, a node connection image generated by repeating the process that arranges nodes and the process that moves the nodes on the nodes excluding the node "017" is output.

Figure 11:
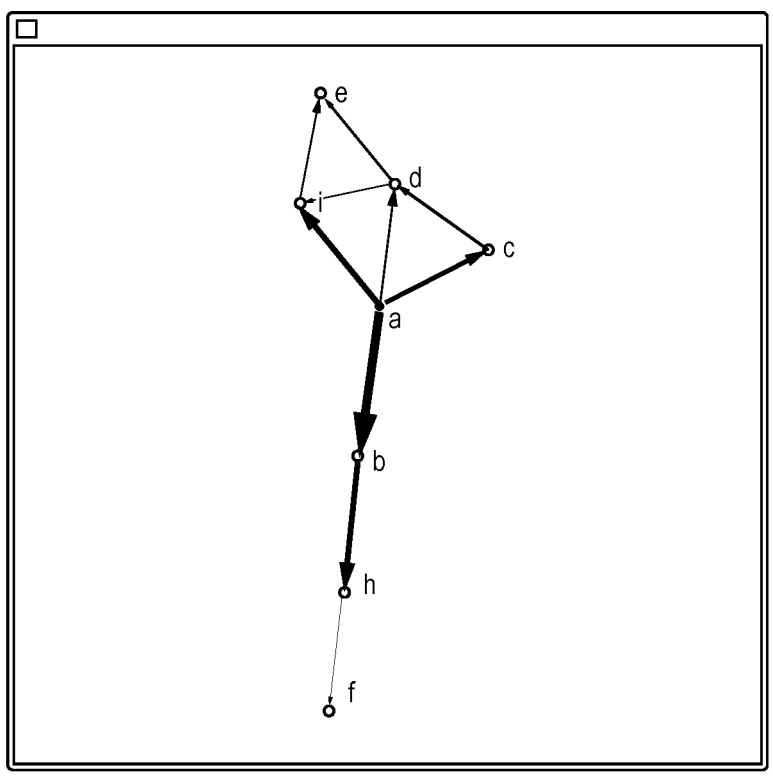
FIG. 11 is a diagram showing a display example of the node arranging apparatus in the Example.

FIG. 11 is a diagram showing an example in which a node connection image is displayed that is generated without arranging the node with "node ID" being "017" in the virtual three-dimensional space. As shown in the drawing, a node connection image is displayed in which the node associated with the node with "node ID" being "017", that is, the node with "component name" being "g" is omitted.

Specific Example 2

Figure 14:
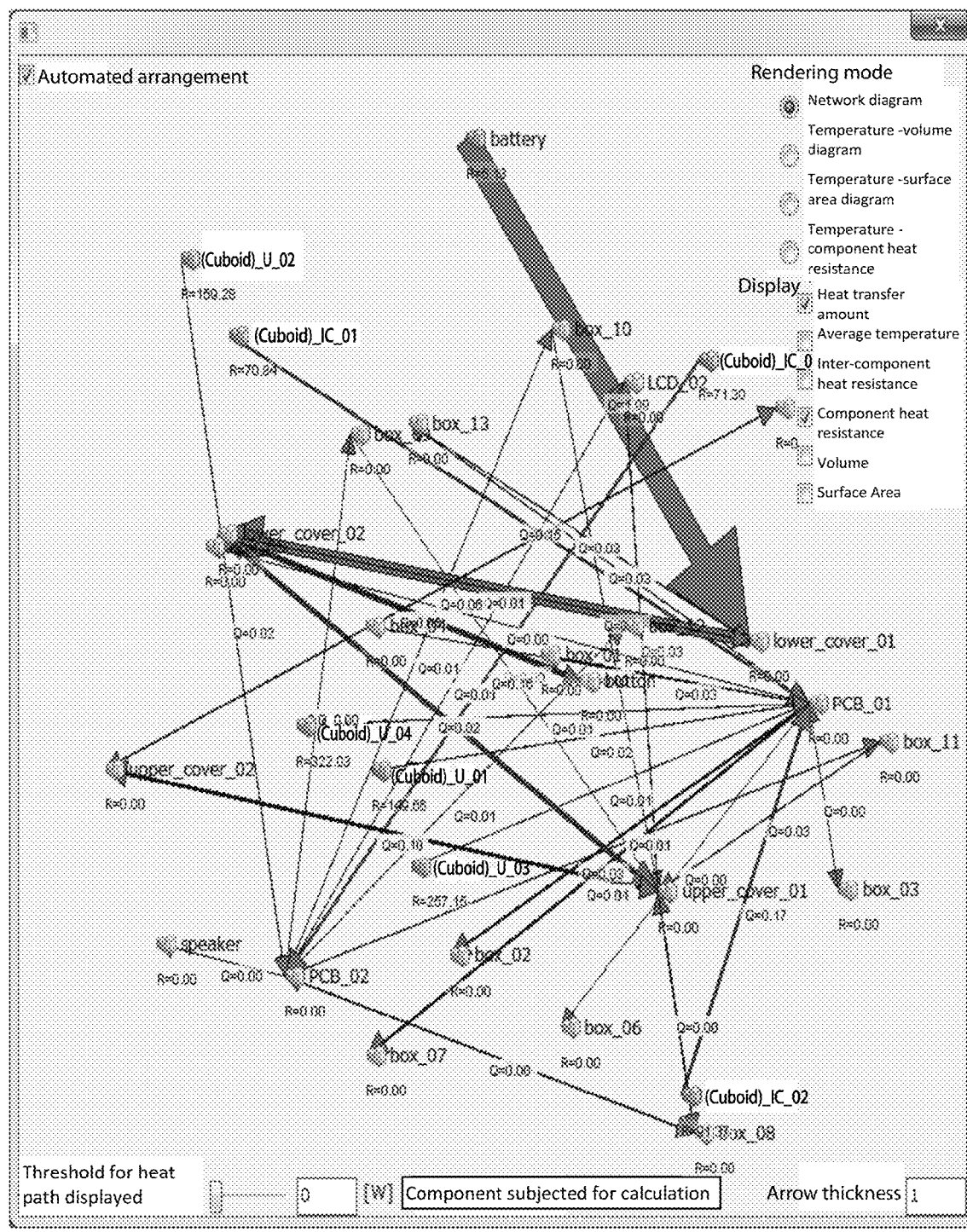
FIG. 14 shows diagrams (FIGS. 14(a) to 14(e)) showing display examples of the node arranging apparatus in the Example.
Figure 14:
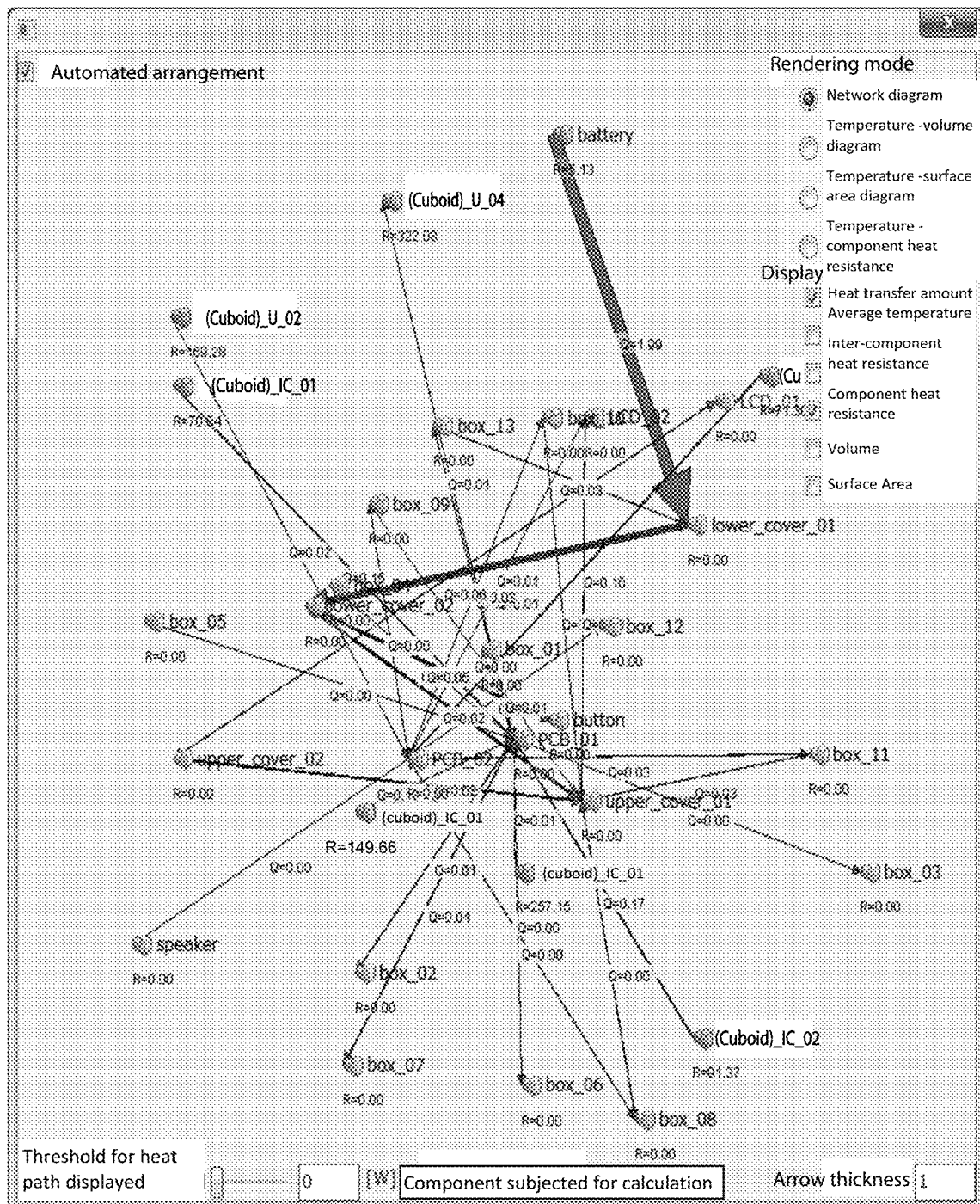
Figure 14:
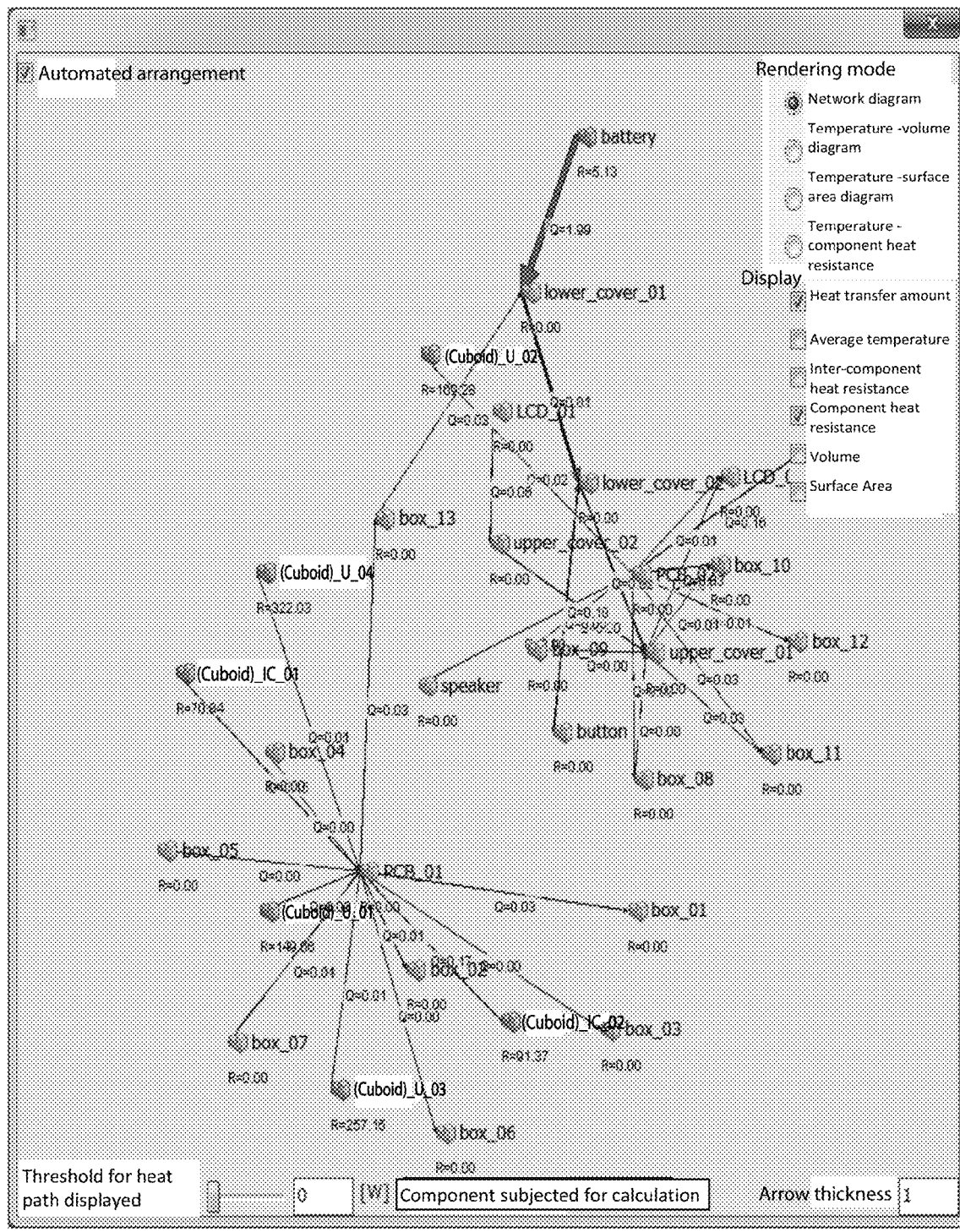
Figure 14:
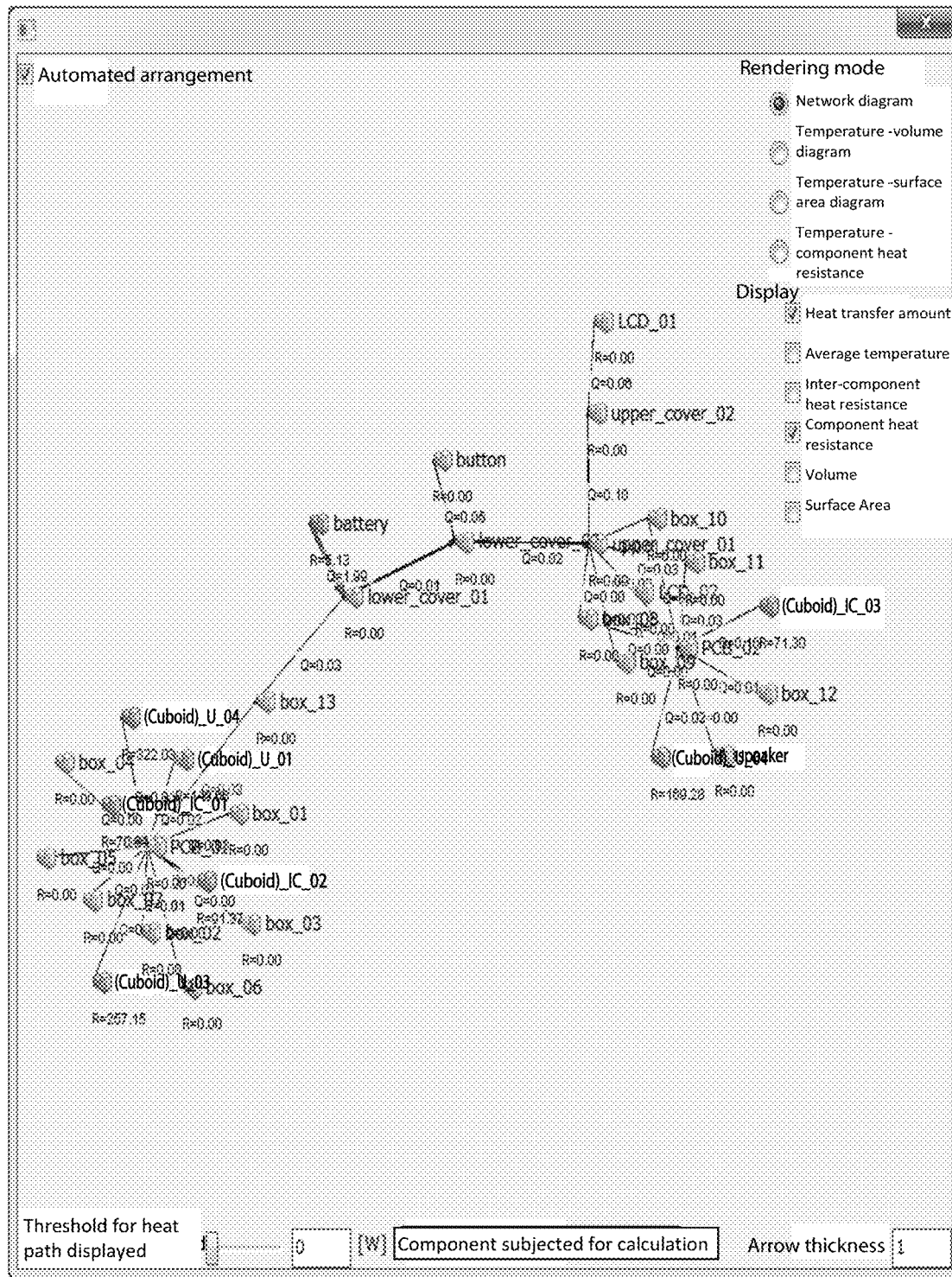
Figure 14:
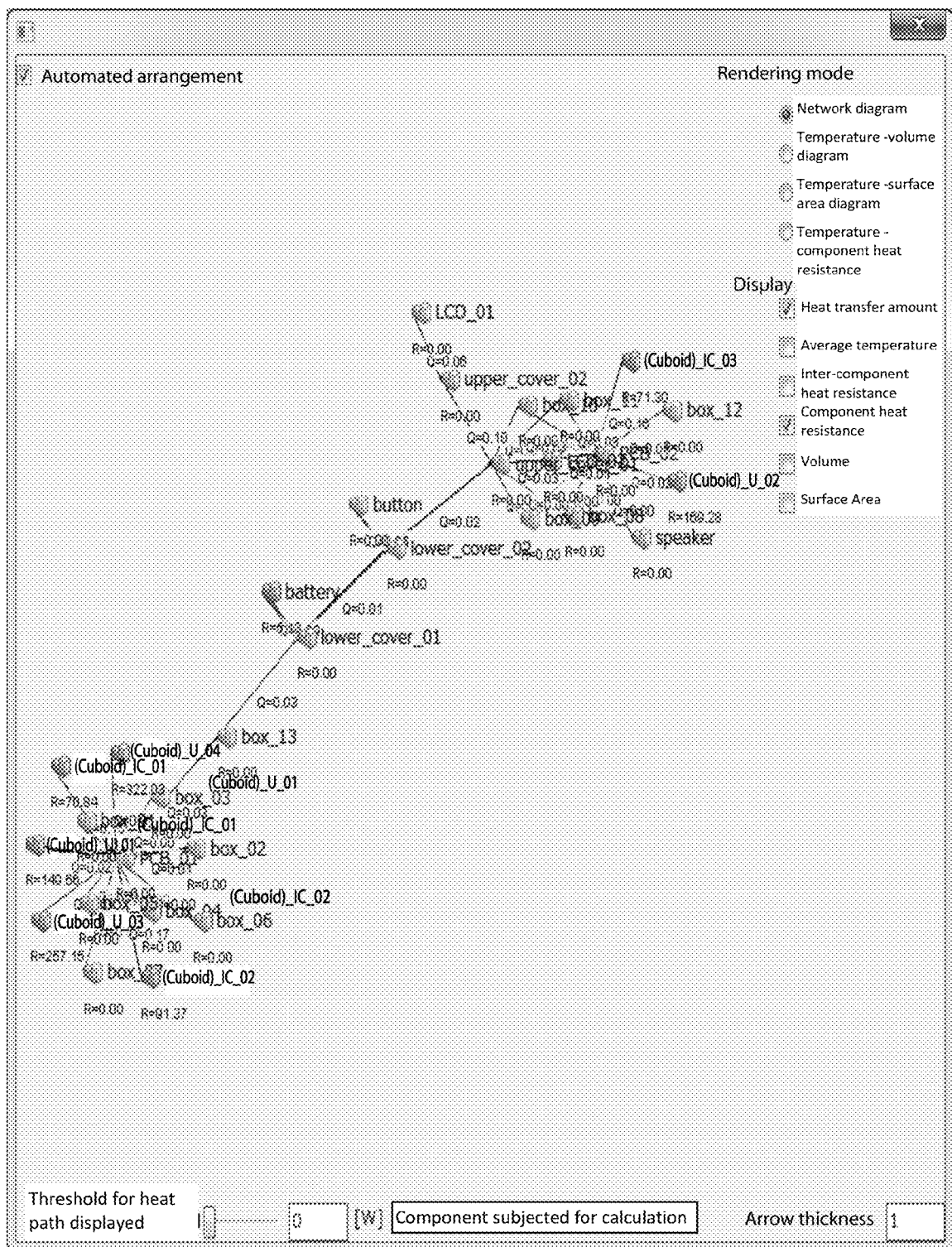

FIG. 14 shows diagrams (FIGS. 14(a) to 14(e)) showing node connection images that are to be output by the output unit 105 in the case where the coefficient dt in Equation (8) is set to different values and the moving process as in the foregoing specific example is performed on the nodes. FIGS. 14(a) to 14(e) respectively show node connection images obtained in the case where the coefficient dt are set to "0.00005", "0.0005", "0.005", "0.05", and "0.5" while the other conditions are kept the same. In this example, the number of times the moving process is repeated is 5000 times. Furthermore, the nodes used in this example are nodes different from those in Specific Example 1. Note that, although the similar process was performed also in the case where the coefficient dt was set to "5.0", the difference between the movement amounts of the nodes was large in this case, and the nodes diverged in the virtual three-dimensional space due to the movement, so that no node connection image was obtained, and, thus, this case is not shown in the drawings.

It is seen from FIG. 14 that it is preferable to set the coefficient dt to "0.005" to "0.5", preferably to "0.05", in order to obtain a node connection image in which nodes do not overlap and connection relationships between the nodes can be clearly seen. Note that this is an example in the case where the number of times the process is repeated is 5000 times, and the coefficient may be set to less than "0.0005" if the number of times the process is repeated is increased.

As described above, according to this Example, nodes are arranged at positions determined by repeatedly performing once or at least twice the process that moves each node, according to an arrangement relationship between the nodes arranged in the virtual three-dimensional space, an arrangement relationship between the nodes that are connected to each other, and an arrangement relationship between the pre-designated first plane and the nodes. Thus, multiple nodes can be properly and easily arranged.

For example, in this Example, nodes that are arranged at random in the virtual three-dimensional space are moved toward the predesignated first plane so as to be arranged near the first plane, nodes that are arranged close to each other are moved so as to increase the distance therebetween, and nodes that are connected each other are moved so as to decrease the distance therebetween until the distance comes close to the first distance. Thus, nodes that are connected to each other can be arranged close to each other, nodes that are not connected to each other can be arranged away from each other, and each node can be arranged close to the plane. Accordingly, the nodes can be arranged such that the relationship between the nodes is easily seen.

Moreover, these processes are repeated multiple times such that the nodes are gradually moved stepwise. Thus, for example, links between the nodes, that is, portions connecting the nodes can be prevented from crossing each other, and the nodes can be prevented from being extremely distributed in a direction parallel to the first plane.

In the foregoing Example, each processing (each function) may be realized as integrated processing using a single apparatus (system), or may be realized as distributed processing using multiple apparatuses.

Furthermore, in the foregoing Example, information relating to the processing performed by each constituent element, for example, information that is to be accepted, acquired, selected, produced, transmitted, or received by each constituent element, information such as a threshold value, a numerical expression, or an address used in each constituent element in the processing and the like may be retained in an unshown storage medium temporarily or for a long period of time even if not specified in the description above. Furthermore, information may be accumulated in the unshown storage medium by each constituent element or by an unshown accumulating unit. Furthermore, information may be read from the unshown storage medium by each constituent element or by an unshown reading unit.

Furthermore, in the foregoing Example, the case was described in which the node arranging apparatus is a stand-alone apparatus, but the node arranging apparatus may be either a stand-alone apparatus or a server apparatus in a server-client system. In the latter case, the output unit and the accepting unit use a communication line to accept input or output a screen.

Furthermore, in the foregoing Example, each constituent element may be configured by dedicated hardware, or, alternatively, constituent elements that can be realized by software may be realized by executing a program. For example, each constituent element may be realized by a program execution unit such as a CPU reading and executing a software program stored in a storage medium such as a hard disk or a semiconductor memory. At the time of executing the program, the program execution unit may execute the program while accessing a storage unit (e.g., a storage medium such as a hard disk or a memory).

The software that realizes the node arranging apparatus in the foregoing Example may be the following sort of program. Specifically, this program is a program used in a state where a computer can access an inter-node information storage unit in which inter-node information, which is information indicating a connection relationship between multiple nodes and is information having node identifiers of the multiple nodes, is stored. The program causes the computer to function as: a node arranging unit that arranges, in a virtual three-dimensional space, nodes indicated by the inter-node information; a node moving unit that moves each node using a movement amount and a movement direction of that node determined by an arrangement relationship between that node arranged in the virtual three-dimensional space and a predesignated first plane, an arrangement relationship between that node arranged in the virtual three-dimensional space and another node arranged in the virtual three-dimensional space, and an arrangement relationship between that node arranged in the virtual three-dimensional space and at least one other node associated therewith by the inter-node information and arranged in the virtual three-dimensional space; a display information generating unit that generates display information for displaying a node connection image, which is an image in which nodes arranged in the virtual three-dimensional space are projected on a plane and is an image in which nodes associated with each other by the inter-node information are connected to each other; and an output unit that outputs the display information generated by the display information generating unit. The node moving unit repeatedly performs at least once the process that moves each node until a predesignated condition is satisfied, and the display information generating unit generates the display information for nodes that have been repeatedly moved by the node moving unit.

Furthermore, in the program, the functions realized by the program do not include functions that can be realized only by hardware. For example, functions that can be realized only by hardware, such as a modem or an interface card, in an acquiring unit that acquires information or an output unit that outputs information are not included in the functions realized by the above-described program.

Furthermore, the computer that executes this program may be a single computer, or may be multiple computers. That is to say, centralized processing may be performed, or distributed processing may be performed.

Figure 12:
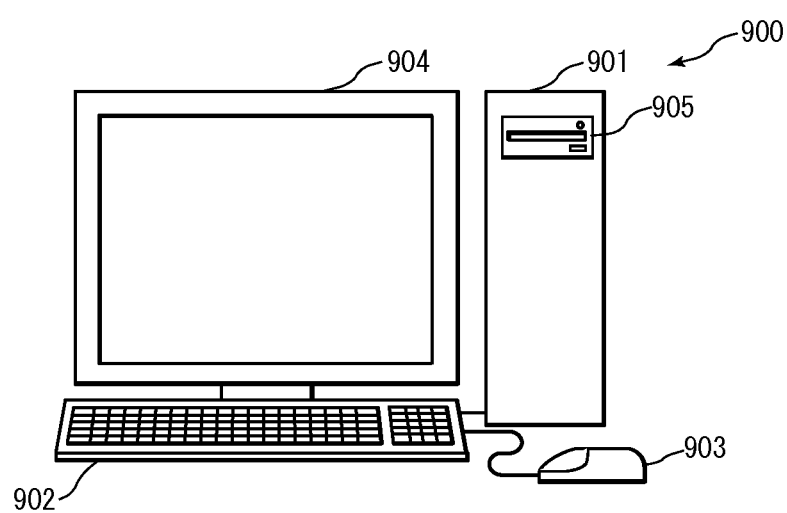
FIG. 12 is a view showing an exemplary appearance of a computer system according to the Example of the present invention.

FIG. 12 is a schematic view showing an exemplary appearance of a computer that executes the program described above to realize the node arranging apparatus in the foregoing Example. The foregoing Example may be realized using computer hardware and computer programs executed thereon.

In FIG. 12, a computer system 900 is provided with a computer 901 including an optical drive 905, a keyboard 902, a mouse 903, and a monitor 904.

Figure 13:
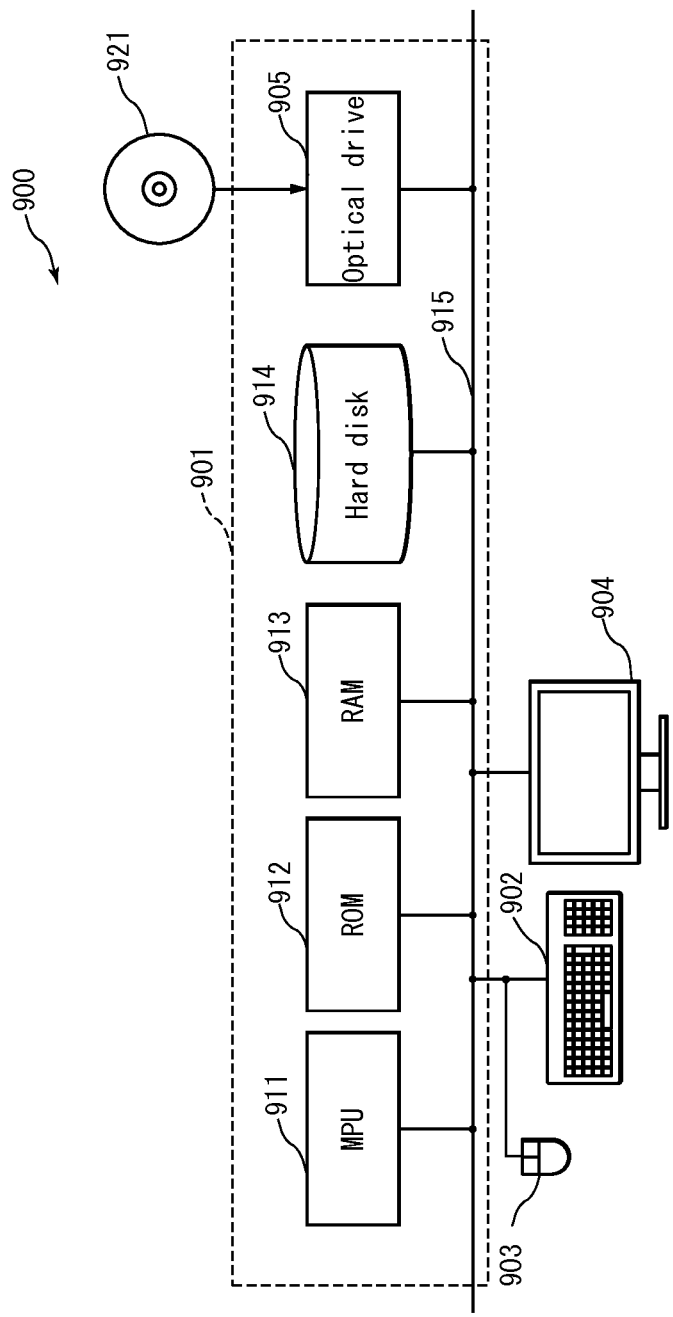
FIG. 13 is a diagram showing an exemplary configuration of the computer system in the Example.

FIG. 13 is a diagram showing an internal configuration of the computer system 900. In FIG. 13, the computer 901 is provided with, in addition to the optical drive 905, a micro processing unit (MPU) 911, a ROM 912 in which a program such as a boot up program is to be stored, a random access memory (RAM) 913 that is connected to the MPU 911 and in which a command of an application program is temporarily stored, and a temporary storage area is to be provided, a hard disk 914 in which an application program, a system program, and data are stored, and a bus 915 that connects the MPU 911, the ROM 912, and the like. Note that the computer 901 may include an unshown network card for providing a connection to a LAN.

The program for causing the computer system 900 to execute the functions of the node arranging apparatus and the like in the foregoing Example may be stored in an optical disk 921 that is inserted into the optical drive 905, and be transmitted to the hard disk 914. Alternatively, the program may be transmitted via an unshown network to the computer 901 and stored in the hard disk 914. At the time of execution, the program is loaded into the RAM 913. The program may be loaded from the optical disk 921, or directly from a network.

The program does not necessarily have to include, for example, an operating system (OS) or a third party program to cause the computer 901 to execute the functions of the node arranging apparatus in the foregoing Example. The program may only include a command portion to call an appropriate function (module) in a controlled mode and obtain desired results. The manner in which the computer system 900 operates is well known, and, thus, a detailed description thereof has been omitted.

The present invention is not limited to the examples set forth herein. Various modifications are possible within the scope of the present invention.

As described above, the node arranging apparatus and the like according to the present invention are suitable as an apparatus for arranging multiple nodes, and are particularly useful as an apparatus for generating information for displaying an image in which multiple nodes are connected.

What is claimed is:

1. A node arranging apparatus, comprising:
an inter-node information storage storing inter-node information, which is information indicating a connection relationship between multiple nodes and is information having node identifiers of the multiple node,
a node arranger arranging, in a virtual three-dimensional space, nodes indicated by the inter-node information;
a node mover moving each node using a movement amount and a movement direction of that node determined by an arrangement relationship between that node arranged in the virtual three-dimensional space and a predesignated first plane, an arrangement relationship between that node arranged in the virtual three-dimensional space and another node arranged in the virtual three-dimensional space, and an arrangement relationship between that node arranged in the virtual three-dimensional space and at least one other node associated therewith by the inter-node information and arranged in the virtual three-dimensional space, wherein the node mover comprises:
a first acquirer acquiring, for each node arranged in the virtual three-dimensional space, a first parameter, which is a parameter having a magnitude that increases according to an increase in a distance to the first plane, and a direction approaching the first plane, and is a parameter used to acquire a movement amount and a movement direction of that node;
a second acquirer acquiring, for each node arranged in the virtual three-dimensional space, a second parameter, which is a parameter having a magnitude and a direction determined according to a distance and a direction with respect to another node arranged in the virtual three-dimensional space, and is a parameter used to acquire a movement amount and a movement direction of that node;
a third acquirer acquiring for each node arranged in the virtual three-dimensional space, a third parameter, which is a parameter having a magnitude and a direction determined according to a distance and a direction with respect to at least one other node associated with that node by the inter-node information, and is a parameter used to acquire a movement amount and a movement direction of that node;
a movement information acquirer acquiring movement information, which is information indicating a movement amount and a movement direction of each node according to the first parameter, the second parameter, and the third parameter acquired for that node by the first acquiring part, the second acquiring part, and the third acquiring part; and
a second mover moving each node using the movement information;
a display information generator generating display information for displaying a node connection image, which is an image in which nodes arranged in the virtual three-dimensional space are projected on a plane and is an image in which nodes associated with each other by the inter-node information are connected to each other; and
a display displaying the display information generated by the display information generator,
wherein the node mover repeatedly performs at least twice the process that moves each node, until a predesignated condition is satisfied, and the first acquirer increases the magnitude of the first parameter each time the node mover performs the process that moves a node, and
wherein the display information generator generates the display information for nodes that have been repeatedly moved by the node mover.

2. The node arranging apparatus according to claim 1, wherein the first acquirer acquires the first parameter having a direction perpendicular to the first plane and approaching the first plane.

3. The node arranging apparatus according to claim 1, wherein the second acquirer acquires the second parameter for each node arranged in the virtual three-dimensional space, by acquiring, for that node, a parameter having a magnitude that increases according to a decrease in an inter-node distance with respect to each other node arranged in the virtual three-dimensional space, and a direction opposite from the other node, and compositing parameters acquired for respective other nodes.

4. The node arranging apparatus according to claim 1, wherein the third acquirer acquires the third parameter for each node arranged in the virtual three-dimensional space, by acquiring, for that node, a parameter having a magnitude that increases according to an increase in a magnitude of a difference between an inter-node distance and a predesignated first distance with respect to each other node associated with that node by the inter-node information, and a direction according to a comparison result between the inter-node distance and the first distance, and compositing parameters acquired for respective other nodes, and the direction according to the comparison result is a direction toward the other node in a case where the comparison result indicates that the inter-node distance is larger than the first distance, and is a direction opposite from the other node in a case where the comparison result indicates that the inter-node distance is smaller than the first distance.

5. The node arranging apparatus according to claim 1, wherein the node arranger arranges, in the virtual three-dimensional space, only nodes indicated by the inter-node information and satisfying a specific condition.

6. A node arranging method performed using: an inter-node information storage storing inter-node information, which is information indicating a connection relationship between multiple nodes and is information having node identifiers of the multiple nodes; a node arranger; a node mover; a first acquirer; a second acquirer; a third acquirer; a movement information acquirer; a second mover; a display information generator; and an output, the method comprising the steps of:
  arranging, by the node arranger in a virtual three-dimensional space, nodes indicated by the inter-node information;
  moving each node, by the node mover, using a movement amount and a movement direction of that node determined by an arrangement relationship between that node arranged in the virtual three-dimensional space and a predesignated first plane, an arrangement relationship between that node arranged in the virtual three-dimensional space and another node arranged in the virtual three-dimensional space, and an arrangement relationship between that node arranged in the virtual three-dimensional space and at least one other node associated therewith by the inter-node information and arranged in the virtual three-dimensional space;
  acquiring, using the first acquirer, for each node arranged in the virtual three-dimensional space, a first parameter, which is a parameter having a magnitude that increases according to an increase in a distance to the first plane, and a direction approaching the first plane, and is a parameter used to acquire a movement amount and a movement direction of that node;
  acquiring, using the second acquirer, for each node arranged in the virtual three-dimensional space, a second parameter, which is a parameter having a magnitude and a direction determined according to a distance and a direction with respect to another node arranged in the virtual three-dimensional space, and is a parameter used to acquire a movement amount and a movement direction of that node;
  acquiring, using the third acquirer, for each node arranged in the virtual three-dimensional space, a third parameter, which is a parameter having a magnitude and a direction determined according to a distance and a direction with respect to at least one other node associated with that node by the inter-node information, and is a parameter used to acquire a movement amount and a movement direction of that node;
  acquiring, using the movement information acquirer, movement information, which is information indicating a movement amount and a movement direction of each node according to the first parameter, the second parameter, and the third parameter acquired for that node by the first acquiring part, the second acquiring part, and the third acquiring part;
  moving, using the second mover, each node using the movement information;
  generating, using the display information generator, display information for displaying a node connection image, which is an image in which nodes arranged in the virtual three-dimensional space are projected on a plane and is an image in which nodes associated with each other by the inter-node information are connected to each other; and
  outputting, using the output, the display information generated by the display information generating step,
  wherein the node moving step comprises the steps of:
    repeatedly performing, at least twice, the process that moves each node at least once until a predesignated condition is satisfied, and,
    increasing, by the first acquirer, the magnitude of the first parameter each time the node mover performs the process that moves a node, and
  wherein in the display information generating step further comprises the step of generating the display information for nodes that have been repeatedly moved in the node moving step.

7. A non-transitory computer-readable storage medium in which a program is stored, the program being used in a state where a computer can access an inter-node information storage storing inter-node information, which is information indicating a connection relationship between multiple nodes and is information having node identifiers of the multiple nodes, the program causing the computer to function as:
  a node arranger arranging, in a virtual three-dimensional space, nodes indicated by the inter-node information;
  a node mover moving each node using a movement amount and a movement direction of that node determined by an arrangement relationship between that node arranged in the virtual three-dimensional space and a predesignated first plane, an arrangement relationship between that node arranged in the virtual three-dimensional space and another node arranged in the virtual three-dimensional space, and an arrangement relationship between that node arranged in the virtual three-dimensional space and at least one other node associated therewith by the inter-node information and arranged in the virtual three-dimensional space;
  a first acquirer acquiring, for each node arranged in the virtual three-dimensional space, a first parameter, which is a parameter having a magnitude that increases according to an increase in a distance to the first plane, and a direction approaching the first plane, and is a parameter used to acquire a movement amount and a movement direction of that node;
  a second acquirer acquiring, for each node arranged in the virtual three-dimensional space, a second parameter, which is a parameter having a magnitude and a direction determined according to a distance and a direction with respect to another node arranged in the virtual three-dimensional space, and is a parameter used to acquire a movement amount and a movement direction of that node;
  a third acquirer acquiring for each node arranged in the virtual three-dimensional space, a third parameter, which is a parameter having a magnitude and a direction determined according to a distance and a direction with respect to at least one other node associated with that node by the inter-node information, and is a parameter used to acquire a movement amount and a movement direction of that node;

a movement information acquirer acquiring movement information, which is information indicating a movement amount and a movement direction of each node according to the first parameter, the second parameter, and the third parameter acquired for that node by the first acquiring part, the second acquiring part, and the third acquiring part;

a second mover moving each node using the movement information;

a display information generator generating display information for displaying a node connection image, which is an image in which nodes arranged in the virtual three-dimensional space are projected on a plane and is an image in which nodes associated with each other by the inter-node information are connected to each other; and an output outputting the display information generated by the display information generator, wherein the node mover repeatedly performs at least twice the process that moves each node, until a predesignated condition is satisfied, and the first acquirer increases the magnitude of the first parameter each time the node mover performs the process that moves a node, and the display information generator generates the display information for nodes that have been repeatedly moved by the node mover.

* * * * *